(12) United States Patent
Chen et al.

(10) Patent No.: US 12,454,568 B2
(45) Date of Patent: Oct. 28, 2025

(54) MONOCLONAL ANTIBODY 2G1 FOR BROAD-SPECTRUM NEUTRALIZATION OF EBOLA VIRUSES AND APPLICATION THEREOF

(71) Applicant: ACADEMY OF MILITARY MEDICAL SCIENCE, PLA, Beijing (CN)

(72) Inventors: Wei Chen, Beijing (CN); Changming Yu, Beijing (CN); Pengfei Fan, Beijing (CN); Xiangyang Chi, Beijing (CN); Guanying Zhang, Beijing (CN); Jianmin Li, Beijing (CN); Lihua Hou, Beijing (CN); Junjie Xu, Beijing (CN); Ting Fang, Beijing (CN); Shipo Wu, Beijing (CN); Yi Chen, Beijing (CN); Zhengshan Chen, Beijing (CN); Yujiao Liu, Beijing (CN); Meirong Wang, Beijing (CN)

(73) Assignee: Academy of Military Medical Science, PLA, Bejing (CN)

( * ) Notice: Subject to any disclaimer, the term of this patent is extended or adjusted under 35 U.S.C. 154(b) by 1211 days.

(21) Appl. No.: 17/272,443

(22) PCT Filed: May 10, 2019

(86) PCT No.: PCT/CN2019/086336
§ 371 (c)(1),
(2) Date: Aug. 12, 2021

(87) PCT Pub. No.: WO2020/093672
PCT Pub. Date: May 14, 2020

(65) Prior Publication Data
US 2024/0254201 A1    Aug. 1, 2024

(30) Foreign Application Priority Data
Nov. 6, 2018    (CN) .......................... 201811309856.1

(51) Int. Cl.
C07K 16/10    (2006.01)
A61K 35/17    (2025.01)
A61P 31/14    (2006.01)
A61K 39/00    (2006.01)

(52) U.S. Cl.
CPC .............. *C07K 16/10* (2013.01); *A61K 35/17* (2013.01); *A61P 31/14* (2018.01); *A61K 2039/505* (2013.01); *C07K 2317/565* (2013.01); *C07K 2317/76* (2013.01); *C07K 2317/92* (2013.01)

(58) Field of Classification Search
None
See application file for complete search history.

(56) References Cited

U.S. PATENT DOCUMENTS 10,501,526 B2 *  12/2019  Kyratsous .............. C07K 16/10
2017/0355751 A1   12/2017  Kyratsous et al.

FOREIGN PATENT DOCUMENTS

| CN | 108373500 A | 8/2018 |
|---|---|---|
| CN | 108424448 A | 8/2018 |
| CN | 108484758 A | 9/2018 |
| CN | 108570106 A | 9/2018 |
| WO | 2017180069 A2 | 10/2017 |

OTHER PUBLICATIONS

Fan, et al. MAbs. Jan.-Dec. 2020;12(1):1742457. doi: 10.1080/19420862.2020.1742457. PMID: 32213108. (Year: 2020).*
Takada, et al. J Virol. Jan. 2003;77(2):1069-74. doi: 10.1128/jvi.77.2.1069-1074.2003. PMID: 12502822. (Year: 2003).*

* cited by examiner

*Primary Examiner* — Benjamin P Blumel
*Assistant Examiner* — Jeffrey Mark Sifford
(74) *Attorney, Agent, or Firm* — Fox Rothschild LLP

(57) ABSTRACT

Disclosed is a monoclonal antibody 2G1 against an Ebola glycoprotein GP2 subunit. The monoclonal antibody has binding activity to EBOV GP, BDBV GP, SUDV GP, and RESTV GP, and can play a neutralizing role.

10 Claims, 19 Drawing Sheets
Specification includes a Sequence Listing.

Binding acitivities to EBOV GPdTM

FIG. 1

Virus Neutralization (HIV-EBOV GP)

| Mutants | EC50 (/WT) | IC50 (/WT) | Mutants | EC50 (/WT) | IC50 (/WT) | Mutants | EC50 (/WT) | IC50 (/WT) |
|---|---|---|---|---|---|---|---|---|
| CDR1_G26A | 1.20 | 3.22 | CDR2_S54A | 1.09 | 2.63 | CDR3_C103A | 99.49 | 371.91 |
| CDR1_Y27A | 1.06 | 0.90 | CDR2_S55A | 1.03 | 1.30 | CDR3_S104A | 0.90 | 0.83 |
| CDR1_T28A | 0.76 | 2.52 | CDR2_F56A | 1.52 | 1.29 | CDR3_G105A | 2.17 | 102.05 |
| CDR1_F29A | 0.93 | 1.56 | CDR2_Y57A | 105.01 | 274.97 | CDR3_G106A | 39.90 | >1000 |
| CDR1_G30A | 1.49 | 3.46 | CDR2_K58A | 1.42 | 1.04 | CDR3_S107A | 0.92 | >1000 |
| CDR1_G31A | 1.21 | 0.43 | CDR2_N59A | 1.32 | 0.85 | CDR3_C108A | 163.00 | 766.97 |
| CDR1_Y32A | 1.30 | 1.34 | CDR3_D99A | 1.03 | 0.44 | CDR3_P109A | 3.17 | >1000 |
| CDR1_S33A | 1.35 | 1.51 | CDR3_M100A | 1.32 | 194.17 | CDR3_M110A | 1.60 | 1.14 |
| CDR2_I51A | 1.26 | 1.32 | CDR3_G101A | 1.62 | 0.82 | CDR3_F111A | 3.89 | 5.29 |
| CDR2_S52A | 0.87 | 1.83 | CDR3_Y102A | 1.62 | 0.32 | CDR3_D112A | 1.08 | 1.42 |
| CDR2_S53A | 0.61 | 1.04 | | 1.31 | 0.80 | CDR3_F113A | 0.79 | 1.84 |

FIG. 20

MA-EBOV: Survival

- 2G1 100µg@2dpi
- 2G1 100µg@1dpi
- PBS

Post-infection (Days)

FIG. 24

GA-SUDV: Survival

- PBS
- 2G1 5mg @ 3 dpi
- 2G1 5mg @ 4dpi
- 2G1 2.5mg @ 4dpi

Post-infection (Days)

SEQUENCE LISTING

```
<160> NUMBER OF SEQ ID NOS: 8

<210> SEQ ID NO 1
<211> LENGTH: 106
<212> TYPE: PRT
<213> ORGANISM: Homo sapiens

<400> SEQUENCE: 1

Asp Ile Gln Met Thr Gln Ser Pro Ser Ser Leu Ser Ala Ser Val Gly
1               5                   10                  15

Asp Arg Val Thr Ile Thr Cys Arg Thr Ser Gln Ser Ile Ser Asn Tyr
            20                  25                  30

Leu Asn Trp Tyr Gln Gln Ile Pro Gly Lys Ala Pro Lys Leu Leu Ile
        35                  40                  45

Ser Thr Ala Ser Asn Leu His Ser Gly Val Ser Ser Arg Phe Ser Gly
    50                  55                  60

Ser Gly Ser Gly Thr His Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Ser
                85                  90                  95

Phe Gly Gln Gly Thr Lys Val Glu Ile Lys
            100                 105

<210> SEQ ID NO 2
<211> LENGTH: 318
<212> TYPE: DNA
<213> ORGANISM: Homo sapiens

<400> SEQUENCE: 2
gacatccaga tgacccagtc tccatcctcc ctgtctgcat ctgtaggaga cagagtcacc      60
atcacttgcc ggacaagtca gagcattagc aactatttaa attggtatca gcagatacca     120
gggaaagccc ctaaactcct gatctctact gcatccaatt tgcacagtgg ggtctcatca     180
aggttcagtg gcagtggatc tgggacacat ttcactctca ccatcagcag tctgcaacct     240
gaagattttg caacttacta ctgtcaacag agttacagta ccccctcgtt cggccaaggg     300
accaaggtgg agatcaaa                                                   318

<210> SEQ ID NO 3
<211> LENGTH: 107
<212> TYPE: PRT
<213> ORGANISM: Homo sapiens

<400> SEQUENCE: 3

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
```

```
                35                  40                  45
Ser Gly Asn Ser Gln Glu Ser Val Thr Glu Gln Asp Ser Lys Asp Ser
         50                  55                  60

Thr Tyr Ser Leu Ser Ser Thr Leu Thr Leu Ser Lys Ala Asp Tyr Glu
 65                  70                  75                  80

Lys His Lys Val Tyr Ala Cys Glu Val Thr His Gln Gly Leu Ser Ser
                 85                  90                  95

Pro Val Thr Lys Ser Phe Asn Arg Gly Glu Cys
            100                 105
```

<210> SEQ ID NO 4
<211> LENGTH: 321
<212> TYPE: DNA
<213> ORGANISM: Homo sapiens

<400> SEQUENCE: 4

```
cgtactgtgg ctgcaccatc tgtcttcatc ttcccgccat ctgatgagca gttgaaatct    60
ggaactgcct ctgttgtgtg cctgctgaat aacttctatc ccagagaggc caaagtacag   120
tggaaggtgg ataacgccct ccaatcgggt aactcccagg agagtgtcac agagcaggac   180
agcaaggaca gcacctacag cctcagcagt accctgacgc tgagcaaagc agactacgag   240
aaacacaaag tctacgcctg cgaagtcacc catcagggcc tgagttcgcc cgtcacaaag   300
agcttcaaca ggggagagtg t                                              321
```

<210> SEQ ID NO 5
<211> LENGTH: 124
<212> TYPE: PRT
<213> ORGANISM: Homo sapiens

<400> SEQUENCE: 5

```
Glu Val Gln Leu Val Glu Ser Gly Gly Gly Leu Val Lys Arg Gly Gly
  1               5                  10                  15

Ser Leu Arg Leu Ser Cys Val Val Ser Gly Tyr Thr Phe Gly Gly Tyr
             20                  25                  30

Ser Met His Trp Val Arg Gln Ala Pro Gly Lys Gly Leu Glu Trp Val
         35                  40                  45

Ser Gly Ile Ser Ser Ser Tyr Tyr Lys Tyr Tyr Ala Asp Ser Val
     50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Ala Glu Asp Thr Ala Val Tyr Tyr Cys
                 85                  90                  95

Ala Arg Asp Met Gly Tyr Cys Ser Gly Gly Ser Cys Pro Asn Phe Asp
            100                 105                 110

Phe Trp Gly Gln Gly Thr Thr Val Thr Val Ser Ser
        115                 120
```

<210> SEQ ID NO 6
<211> LENGTH: 372
<212> TYPE: DNA
<213> ORGANISM: Homo sapiens

<400> SEQUENCE: 6

```
gaggtgcagc tggtggagtc tgggggaggc ctggtcaagc ggggggggtc cctgagactc    60
tcctgtgtag tctccggata caccttcggt ggatatagca tgcactgggt ccgccaggct   120
ccagggaagg gactggagtg gtctcaggc attagtagta gtagttatta caaatactac   180
```

```
gcagactcag tgaagggccg attcaccatc tccagagaca acgccaagaa ctcactgtat    240
ctgcaaatga atagcctgag agccgaggac acggctgttt attactgtgc gagagatatg    300
ggatattgta gtggtggtag ctgccctaac tttgacttct ggggccaggg aaccacggtc    360
accgtctcct ca                                                        372
```

<210> SEQ ID NO 7
<211> LENGTH: 330
<212> TYPE: PRT
<213> ORGANISM: Homo sapiens

<400> SEQUENCE: 7

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Pro
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Phe Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330
```

```
<210> SEQ ID NO 8
<211> LENGTH: 990
<212> TYPE: DNA
<213> ORGANISM: Homo sapiens

<400> SEQUENCE: 8
gcgtcgacca agggcccatc ggtcttcccc ctggcaccct cctccaagag cacctctggg      60
ggcacagcgg ccctgggctg cctggtcaag gactacttcc ccgaaccggt gacggtgtcg     120
tggaactcag gcgccctgac cagcggcgtg cacaccttcc cggctgtcct acagtcctca     180
ggactctact ccctcagcag cgtggtgacc gtgccctcca gcagcttggg cacccagacc     240
tacatctgca acgtgaatca caagcccagc aacaccaagg tggacaagaa agttgagccc     300
aaatcttgtg acaaaactca cacatgccca ccgtgcccag cacctgaact cctgggggga     360
ccgtcagtct tcctcttccc cccaaaaccc aaggacaccc tcatgatctc ccggacccct     420
gaggtcacat gcgtggtggt ggacgtgagc cacgaagacc ctgaggtcaa gttcaactgg     480
tacgtggacg gcgtggaggt gcataatgcc aagacaaagc cgcgggagga gcagtacaac     540
agcacgtacc gtgtggtcag cgtcctcacc gtcccgcacc aggactggct gaatggcaaa     600
gagtacaagt gcaaggtctc caacaaagcc ctcccagccc ccatcgagaa aaccatctcc     660
aaagccaaag ggcagccccg agaaccacag gtgtacaccc tgcccccatt ccgggatgag     720
ctgaccaaga accaggtcag cctgacctgc ctggtcaagg gcttctatcc cagcgacatc     780
gccgtggagt gggagagcaa tgggcagccg gagaacaact acaagaccac gcctcccgtg     840
ctggactccg acggctcctt cttcctctac agcaagctca ccgtggacaa gagcaggtgg     900
cagcagggga acgtcttctc atgctccgtg atgcatgagg ctctgcacaa ccactacacg     960
cagaagagcc tctccctgtc tccgggtaaa                                     990
```

MONOCLONAL ANTIBODY 2G1 FOR BROAD-SPECTRUM NEUTRALIZATION OF EBOLA VIRUSES AND APPLICATION THEREOF

TECHNICAL FIELD

The invention discloses an antibody, belonging to the technical field of polypeptides.

BACKGROUND TECHNOLOGY

Ebola virus (EBOV) can cause acute severe hemorrhagic fever in humans and non-human primates, which is one of the viruses with the highest fatality rate found so far, with a fatality rate up to 90%. EBOV can be transmitted directly through contact, and is highly contagious and lethal. The glycoprotein (GP) spike on the surface of the Ebola virus envelope mediates the attachment and entry of the virus, and is an important target for neutralizing antibodies. The GP gene of Ebola virus is mainly processed into two proteins: one is non-structural GP (secreted glycoprotein, sGP), and the other is structural GP. GP is initially synthesized as a polypeptide, and then cleaved by Furin into subunits GP1 (1-501 amino acid) and GP2 (502-676 amino acid). The two subunits are linked by disulfide bonds, and the GP trimer is anchored on the surface of the particles by the transmembrane domain (TM) within GP2. GP1 consists of several domains including mucin, glycan cap (GC), head and base. The GP structure after Furin cleavage cannot directly induce the membrane fusion process between the EBOV and the host cell. The interactions between GP and several molecules on the surface of the cell membrane mediates the virus adhesion to host cells. However, these molecules are not critical receptors for virus entry. After adhesion, the virus entries cells through endocytosis and pinocytosis mediated by clathrin, and then undergo the transportation of early and late endosomes. GP is digested by cathepsin B and L in late endosomes to remove about 60% of the amino acids on the GP1, including mucin and glycan cap, forming an activated GP (primed GP, $GP_{CL}$), then a critical process of membrane fusion is activated. $GP_{CL}$ binds to the C domain of endosomal membrane protein Niemann-Pick C1 (NPC1-C) to mediate membrane fusion, which makes the viral RNA enter the cytoplasm to complete viral genome replication and transcription. After the synthesis of the new viral protein, the progeny virions are assembled and budded from the surface of the host cell. Endosomal membrane protein NPC1 is an indispensable host factor in EBOV infection.

Ebola virus is listed as a category A biological/bioterrorism warfare agent by the US NIH and CDC, and it is also classified as one of the pathogens with major dangers and risks to national security and public health. There is still no approved drugs to treat Ebola virus infection. Since discovered in 1976, Ebola virus has caused 13 large-scale epidemics. In 2014, the largest and most difficult-to-control Ebola epidemic in history broke out in West Africa. The pathogen was identified as the Zaire Ebola virus and caused more than 10,000 deaths and more than 25,000 infections (according to The Ebola epidemic Report released by WHO on Feb. 17, 2016). The outbreak spreads outside the African continent for the first time and caused great panic around the world. The high attention of the public and the authorities has rapidly advanced the research on Ebola vaccine and antiviral drugs.

Several promising Ebola vaccine clinical trials including gorilla adenovirus type 3 vector vaccine, adenovirus type 5 vector vaccine, and vesicular stomatitis virus vector vaccine have been rapidly carried out domestically and globally. It is undeniable that the development of effective preventive drug measures is an important goal and it is considered that the preventive measures can save a large number of lives. However, vaccines are difficult to work in some cases, such as: 1) there may be differences among host individuals (such as the weak of immune system of the elderly, young people and immunocompromised persons); 2) the immune effect of the vaccine gradually weakens after prolonged immunization; 3) the immunity of the host stimulated by the vaccine cannot resist high dose of Ebola virus exposure; 4) As most patients seek drug help only after the Ebola virus infection signal appears, Vaccine is difficult to stimulate the effective immune response of the host in a short treatment window. Therefore, the research and development of drugs for the treatment of Ebola virus disease should not be ignored in the process of vaccine development. At present, neutralizing antibodies against Ebola virus may play a protective role in three ways: 1) inhibiting the hydrolysis of GP by cathepsins; 2) blocking the binding of activated GP to the NPC1 receptor; 3) affecting the allosteric process of GP from binding to NPC1 receptor to membrane fusion. Among them, the first two patterns have been confirmed in reports, and the third pattern is speculation in some literatures, and there is no direct proof yet.

Although there is no approved drug for Ebola virus disease, a number of experimental anti-Ebola drugs are being studied, including small interference RNA, antisense oligodeoxynucleotides, nucleotide analogues, antibodies and so on. In August 2018, the Ebola epidemic broke out again in the Democratic Republic of the Congo, resulting in 1154 infections and 731 deaths as of Apr. 7, 2019. Since the outbreak, WHO has approved five drugs in the research stage that can be used for emergency treatment of Ebola virus disease, including three antibody drugs (Zmapp, REGN3470-3471-3479, and mAb114) and two small molecule drugs (Remdesivir and Favipiravir). Among them, the antibody drug "Zmapp" made from a mixture of three monoclonal antibodies and its optimized option "MIL77" successfully saved many lives during the West Africa Ebola outbreak in 2014. They have far better effect and treatment window length than other kinds of antiviral drugs, the drug safety and patient cure rate being improved greatly, and the great encouragement being given to the people. The application of antibody drugs in the treatment of filovirus diseases has attracted worldwide attention and become a hot spot in the field of drugs for the treatment of Ebola virus diseases.

Zmapp is a cocktail treatment strategy composed of three human-mouse chimeric monoclonal antibodies (c2G4, c4G7, and c13C6) expressed by the tobacco system, in which c2G4 (epitopes are C511, N550, G553, C556) and c4G7 (epitopes are C511, D552, C556) bind to the GP2 subunit, both sharing with overlapped epitopes; c13C6 (epitopes are T270 and K272) binds to the glycan cap at an approximately vertical angle to GP trimer. MIL77 is an optimization of Zmapp. MIL77-1/-2/-3 contains the variable regions of c2G4, c4G7, and c13C6, respectively. However, MIL77-1/-2/-3 have humanized framework regions and are expressed in CHO cells. The cocktail combination therapy of MIL77-1 and ML77-3 can achieve 100% protective activity against EBOV in non-human primates 72 hours post infection.

SUMMARY OF THE PRESENT INVENTION

Technical Problem

However, the three anti-Ebola virus antibody drugs approved by the WHO for emergency use only target Zaire Ebola virus (ZEBOV). About 35% of Ebola outbreaks are caused by other types of ebolavirus such as Sudan ebolavirus (SUDV) and Bundibugyo ebolavirus (BDBV). Related research has reported some monoclonal antibodies that can broadly neutralize multiple types of Ebolavirus, bringing new enlightenment to the treatment of Ebola virus disease. The development of monoclonal antibodies with unique epitopes and capable of broadly neutralizing multiple ebolaviruses has become a major technical requirement in this field. If there are monoclonal antibodies against ebolavirus with conservative epitopes, broader spectrum and better protective activity, there will be better and more options for the treatment of Ebola virus disease. Therefore, the objective of the invention is to provide a broad spectrum monoclonal antibody against Ebolavirus which can target a unique epitope, and further to provide its application in the preparation of drugs for the treatment of Ebola virus disease.

Solutions to Technical Problem

For the above objective, the present invention firstly provides an isolated monoclonal antibody that specifically binds to Ebola virus glycoprotein GP2 subunit, wherein the CDR1, CDR2 and CDR3 of light chain variable domain of the said antibody has the amino acid sequence as 27-32 of SEQ ID NO. 1, 50-52 of SEQ ID NO. 1 and 89-96 of SEQ ID NO. 1 respectively; the CDR1, CDR2 and CDR3 of heavy chain variable domain of the said antibody has the amino acid sequence as 26-33 of SEQ ID NO. 5, 51-58 of SEQ ID NO. 5 and 97-113 of SEQ ID NO. 5.

In a preferred embodiment, the light chain variable domain of the said antibody has the amino acid sequence shown in SEQ ID NO. 1, the heavy chain variable domain of the said antibody has the amino acid sequence shown in SEQ ID NO. 5.

In a more preferred embodiment, the light chain constant region of the said antibody has the amino acid sequence shown in SEQ ID NO. 3, and the heavy chain constant region of the said antibody has the amino acid sequence as shown in SEQ ID NO. 7.

Secondly, the present invention also provides an isolated nucleic acid molecule encoding the light chain and heavy chain of the above-mentioned monoclonal antibody, the said isolated nucleic acid molecule encoding the light chain variable domain has the nucleotide sequence shown in SEQ ID NO. 2, and the isolated nucleic acid molecule encoding the heavy chain variable domain has the nucleotide sequence shown in SEQ ID NO. 6.

In a preferred embodiment, the said isolated nucleic acid molecule encoding the light chain constant region has the nucleotide sequence shown in SEQ ID NO. 4, and the isolated nucleic acid molecule encoding the heavy chain constant region has the nucleotide sequence shown in SEQ ID NO. 8.

Thirdly, the present invention also provides a functional element expressing the above-mentioned isolated nucleic acid molecule.

In a preferred embodiment, the said functional element is a linear expression cassette.

Fourthly, the present invention provides a host cell comprising the above-mentioned linear expression cassette, wherein the host cell is 293T cell.

Finally, the present invention provides the above-mentioned monoclonal antibody for use as a drug for the treatment of Ebola virus disease.

Beneficial Effects of the Present Invention

The monoclonal antibody 2G1 against the envelope glycoprotein of ebolavirus provided by the invention has unique CDR regions, showing excellent sub-nanomolar affinity with GPdMucin. The association rate constant $Ka=5.11 \times 10^4$ (1/Ms), the dissociation rate constant $Kd=3.75 \times 10^{-5}$ (1/s), and the affinity constant $KD=7.34 \times 10^{-10}$ (M). It has good binding activity to EBOV GP, BDBV GP, SUDV GP and RESTV GP, with $EC_{50}$ values of 0.0059 µg/mL, 0.0075 µg/mL, 0.0048 µg/mL and 0.026 µg/mL respectively, showing excellent broad-spectrum in antigen binding ability. Compared with the control antibody, 2G1 can effectively neutralize EBOV, BDBV and SUDV pseudoviruses in vitro. The neutralizing activity of 2G1 increases with the increase of the concentration of 2G1, and nearly 100% protection against three Ebola pseudoviruses could be achieved at the concentration of 1 µg/mL. The neutralizing activity of 2G1 monoclonal antibody against EBOV-eGFP-Mayinga authentic virus is better than that of the positive control antibody in vitro. Neutralization assay in vitro shows that 2G1 is a good broad-spectrum neutralizing monoclonal antibody against Ebolavirus. The result of competitive binding assays shows that the binding epitopes of 2G1 are different from those of control antibodies, suggesting that 2G1 has the potential to form a cocktail therapy with other neutralizing antibodies.

The binding stability test shows that there is no obvious change in the binding activity of 2G1 to GPdMucin under four different pH conditions. The binding of 2G1 to GP is stable and not affected by the low pH environment of late endosomes, which lays a foundation for its neutralization.

Animal challenge experiments show that the 2G1 treatment groups can get complete protected after mice challenged with the EBOV (Mayinga) virus strain and guinea pigs challenged with SUDV.

The antibody provided by the invention also has unique interaction sites, which are different from the sites of antibodies against ebolavirus envelope glycoprotein previously reported, suggesting that 2G1 has the potential to form a cocktail therapy with other neutralizing antibodies.

BRIEF DESCRIPTION OF THE DRAWINGS

FIG. 1 Binding activity curves of screened serum samples;

FIG. 2 Neutralizing curves of screened serum samples;

FIG. 9 Determination curves of affinity of 2G1 with GPdMucin;

FIG. 10 Evaluation of 2G1 neutralization ability using EBOV-eGFP virus;

Figure 11:
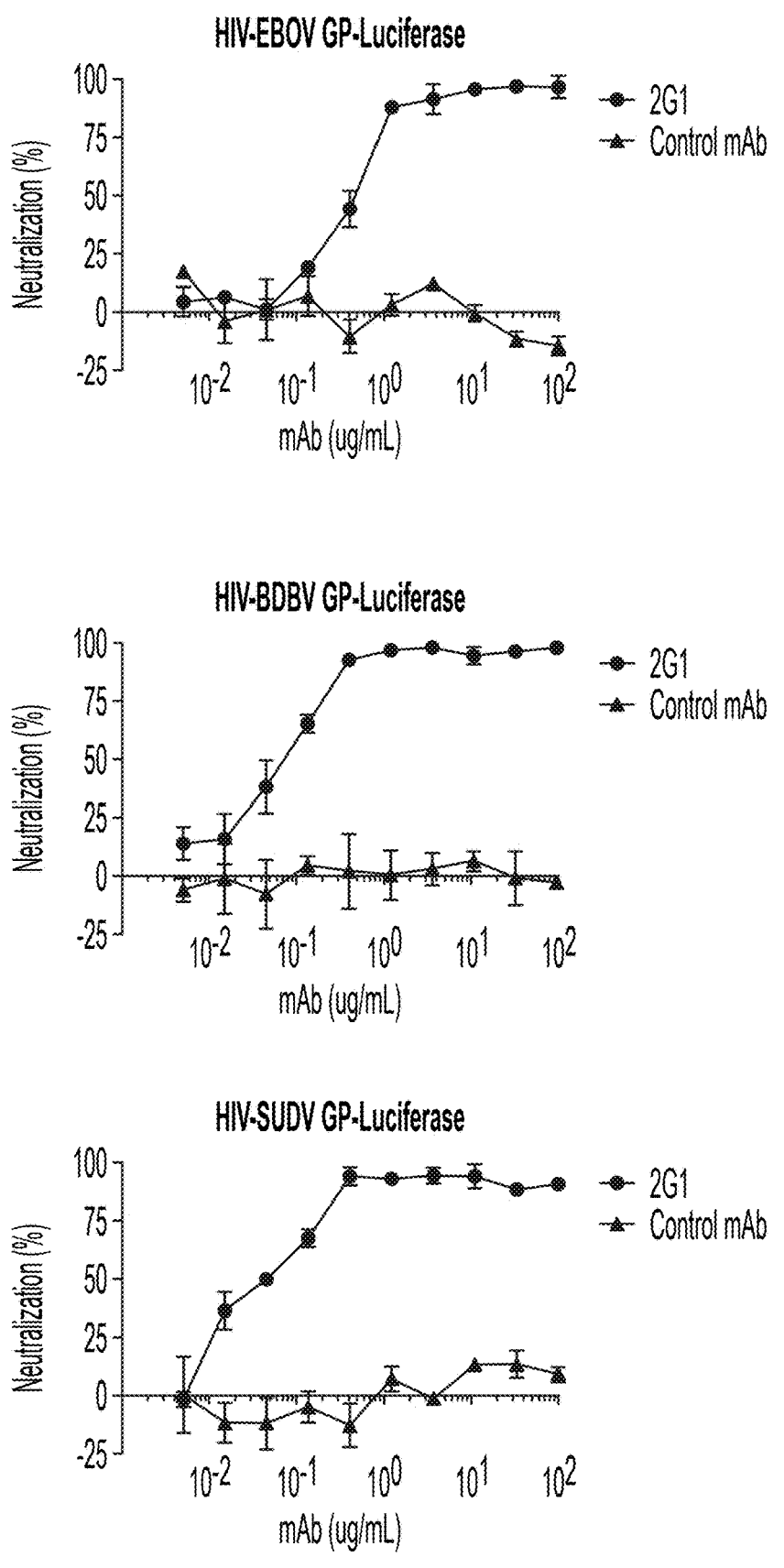

FIG. 11 Neutralizing curves of 2G1 to different pseudoviruses;

FIG. 20 Comparison of binding/neutralizing activity between mutant and wild-type 2G1;

FIG. 24 Curves of 2G1 protecting mice challenged with EBOV (Mayinga);

FIG. 25 Curves of 2G1 protecting guinea pigs challenged with SUDV;

FIG. 26 Weight changes of guinea pigs attacked by SUDV with or without 2G1 treatment.

EXAMPLES

Figure 3:
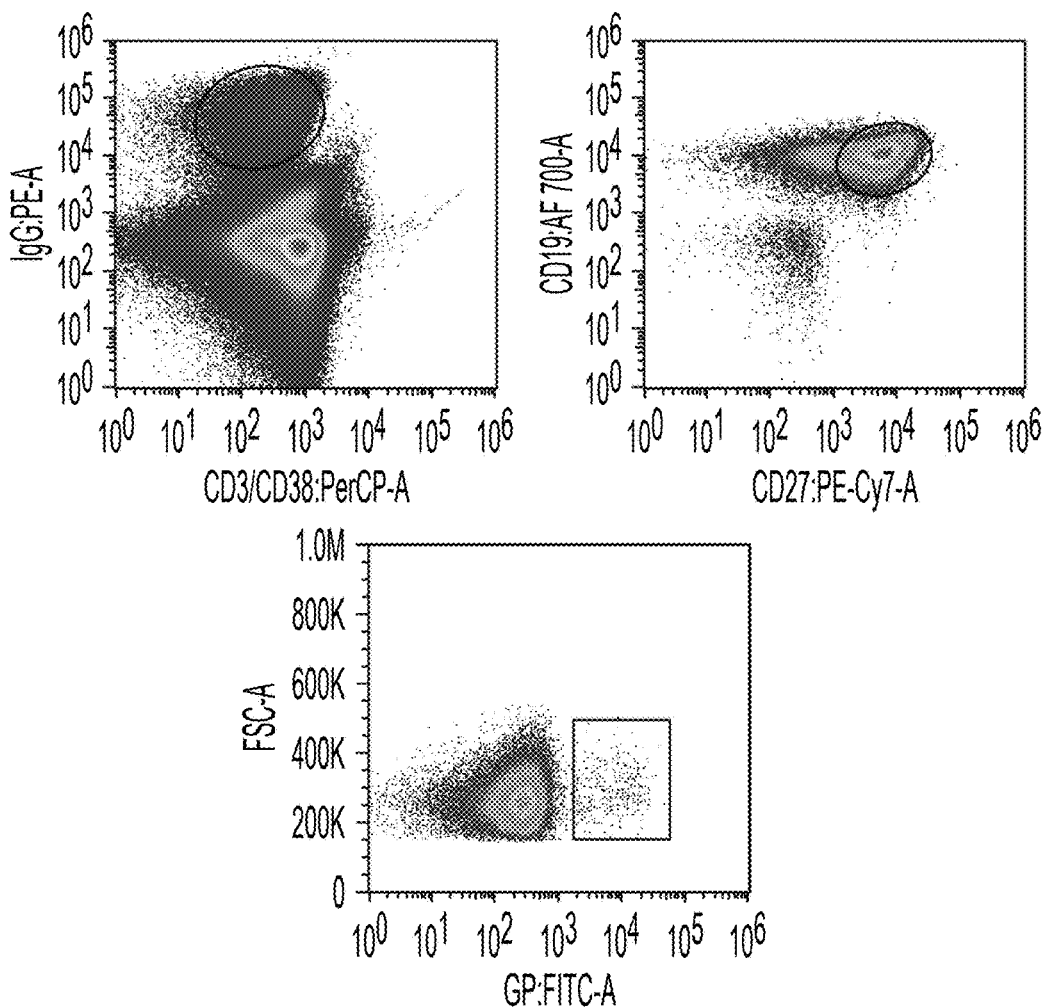
FIG. 3 Sorting of memory B cells through flow cytometry.

The present invention is further described with specific examples below, and the advantages and features of the present invention will become clearer with the description. However, these examples are only exemplary, and do not constitute any limitation on the protection scope defined by the claims of the present invention.

Example 1. Antibody Preparation

1) Collection of Blood Samples

After obtaining informed consent form, 5 mL of blood samples were collected from subjects in clinical trials of recombinant Ebola vaccine 28 days after the second immunization for subsequent studies.

2) Determination of Serum Binding Titer
   a) One day before the experiment, 96-well ELISA plates are coated with 100 µL of EBOV GPdTM (purchased from IBT Bioservices) at 1 µg/mL, and incubated overnight at 4° C.
   b) On the following day, the plates are washed five times with a plate washer (BIO-TEK, 405_LS). Plates are then blocked with 100 µL of blocking solution (PBST containing 2% BSA) and incubated at 37° C. for 1 h.
   c) After five washes, serial 3-fold dilutions of the P024 serum sample starting at a ratio of 1:100 are added (100 µL/well) and incubated for 1 h at 37° C.
   d) After five washes, 100 µL of 1:10,000 diluted goat anti-human IgG Fc-HRP (Ab97225; Abcam) are added (100 µL/well) to plates and incubated for 1 h at 37° C.
   e) After five washes, plates were incubated with 100 µL of TMB single-component substrate solution (Solarbio) for 6 min in the dark at room temperature, followed by addition of 50 µL stop solution.
   f) The optical density at a dual-wavelength of 450 nm and 630 nm is read on a Spectramax 190 reader.

As shown in FIG. 1, the binding activity of serum sample of #024 to EBOV GP at 28 days after second immunization (S024-V10) is significantly higher than that before immunization (S024-V0), and the antibody titer is above $10^6$.

3) Determination of Serum Neutralization Ability
   a) Packaging pseudovirus: pDC316-EBOV GP and pNL4-3.Luc.R-E- are co-transfected into 293T cells, and the cell supernatant is collected 24 h later. The titer of pseudovirus is determined using Luciferase Assay System (Promega, E1501), and store pseudovirus in aliquots at −80° C.
   b) Sera samples are diluted at a starting ratio of 1:5, followed by 3-fold serial dilutions. A volume of 50 µL is added to each well.
   c) A volume of 50 µL pseudovirus diluted with medium is added to each well, and incubate the serum-pseudovirus mixture at 37° C. for 1 h.
   d) After counting, 100 µL of 293T cells at a density of $2\times10^5$ cells/mL is added to each well, and the 96-well cell culture plates are incubated at 37° C. for 36 h.
   e) Take out the plates, carefully remove the culture medium. Add 100 µL of cell lysate (Promega, E1500) to each well and shake at 350 rpm for 15 min on a shaker.
   f) Centrifuge at 3000 rpm for 10 min at room temperature.
   g) Add 20 µL of the lysate to GLOMAX 96 Microplate Luminometer (Promega), read the fluorescence value using Luciferase Assay System, and calculate the protection rate of the antibody to the cells.

As shown in FIG. 2, compared with pre-immunization serum, post-immunization serum of #024 showed good neutralization activity against HIV-EBOVGP-Luc pseudovirus ($IC_{50}$=1277). Therefore, sample #024 will be used for antibody isolation.

4) Labeling of GPΔMuc with FITC

Fluorescence-labeled antigen is needed to sort specific memory B cells. The method of Fluorescein Isothiocyanate (FITC) labeling GPdMucin is described as follows:
   a) FITC (SIGMA, F4274) is dissolved in DMSO at a final concentration of 20 mg/mL.
   b) Take 100 µL of GPdMucin (about 3.3 mg/mL) and add 300 µL of carbonate buffer (pH=9.6).
   c) Add 8 µL FITC to the GPdMucin solution and incubate for 3 h at 4° C. in the dark.
   d) Buffer-exchange the protein into PBS using a 50 kDa centrifugal concentrator tube until the filtrate is transparent and colorless. Wrap the labeled protein in tin foil paper and store it at 4° C. until use.

5) Flow Sorting of Memory B Cells

PBMCs are isolated from blood samples using a Ficoll density gradient centrifugation method, details are described as follows:
   a) Take fresh EDTA anticoagulant whole blood and dilute with the same volume of PBS.
   b) Add separation solution to a centrifuge tube, and carefully add the diluted blood over the surface of the separation solution to keep the interface clear. The volume of separation solution, anticoagulant undiluted blood, and PBS is 1:1:1.
   c) Tube is centrifuged at 800×g, acceleration 3, room temperature, for 30 min.
   d) After centrifugation, the bottom of the tube is red blood cells, the middle layer is the separation solution, and the uppermost layer is the plasma/tissue homogenate layer. The thin and dense white layer between plasma and the separation solution is mononuclear cells layer (contain lymphocytes and monocytes). Carefully pipette the mononuclear layer into another centrifuge tube.

e) Dilute the cells with PBS and gently invert and mix well. Tube is centrifuged at 300×g, room temperature, for 10 min. Discard supernatant and repeat twice.

f) Resuspend the lymphocytes in PBS for later use.

g) Count $1\times10^6$ cells in a volume of 100 μL PBS, add the 6 kinds of fluorescent dyes recommended in the following table, and incubate for 1 h at 4° C. in the dark.

| Molecular marker | Fluorescence | Company/Cat. No. | Volume (per 1 × 10⁶ cells) |
|---|---|---|---|
| GPdMucin | FITC | SIGMA, F4274 | 2 μL |
| IgG | PE | BD, 555787 | 40 μL |
| CD19 | APC-AF 700 | Beckman, IM2470 | 10 μL |
| CD3 | PerCP | BD, 552851 | 20 μL |
| CD38 | PerCP | Biolegend, 303520 | 10 μL |
| CD27 | PC7 | Beckman, A54823 | 10 μL | h) Wash cells 2-3 times with PBS containing 2% FBS and resuspend in 400 μL FPBS. Remove cell clusters with a 40 μm cell filter, and store at 4° C. in the dark for sorting.

i) GP-specific single memory B cells are sorted by a cell sorter (SONY, SH800S) using a strategy of IgG⁺/CD3⁻/CD38⁻/CD19⁺/CD27⁺/GPdMucin⁺. Each single cell is directly sorted into 96-well plates contains 5 U RNase inhibitor and 19.8 μL RNase free water in each well. Store plates at −80° C.

Cell sorting result is shown in FIG. 3. The cells circled in the figure are characterized by IgG⁺/CD3⁻/CD38⁻/CD19⁺/CD27⁺/GPdMucin⁺, which are expected GP-specific memory B cells.

6) Amplification of Antibody Genes by Single Cell PCR a) Reverse Transcription PCR Eighty GPdMucin-specific memory B cells are sorted, and all of the following specific primers for heavy chain, kappa light chain, or lambda light chain are added to each reaction system (see Table 1 for primer sequences).

TABLE 1

Reverse transcription PCR primers

| | Primers | Sequences |
|---|---|---|
| H | 5' L-VH 1 | ACAGGTGCCCACTCCCAGGTGCAG |
| | 5' L-VH 3 | AAGGTGTCCAGTGTGARGTGCAG |
| | 5' L-VH 4/6 | CCCAGATGGGTCCTGTCCCAGGTGCAG |
| | 5' L-VH 5 | CAAGGAGTCTGTTCCGAGGTGCAG |
| | HuIgG-const-anti | TCTTGTCCACCTTGGTGTTGCT |
| | 3' Cμ CH1 | GGGAATTCTCACAGGAGACGA |
| κ | 5' L Vκ 1/2 | ATGAGGSTCCCYGCTCAGCTGCTGG |
| | 5' L Vκ 3 | CTCTTCCTCCTGCTACTCTGGCTCCCAG |
| | 5' L Vκ 4 | ATTTCTCTGTTGCTCTGGATCTCTG |
| | 3' Cκ 543-566 | GTTTCTCGTAGTCTGCTTTGCTCA |

TABLE 1-continued

Reverse transcription PCR primers

| | Primers | Sequences |
|---|---|---|
| λ | 5' L Vλ 1 | GGTCCTGGGCCCAGTCTGTGCTG |
| | 5' L Vλ 2 | GGTCCTGGGCCCAGTCTGCCCTG |
| | 5' L Vλ 3 | GCTCTGTGACCTCCTATGAGCTG |
| | 5' L Vλ 4/5 | GGTCTCTCTCSCAGCYTGTGCTG |
| | 5' L Vλ 6 | GTTCTTGGGCCAATTTTATGCTG |
| | 5' L Vλ 7 | GGTCCAATTCYCAGGCTGTGGTG |
| | 5' L V2 8 | GAGTGGATTCTCAGACTGTGGTG |
| | 3' Cλ | CACCAGTGTGGCCTTGTTGGCTTG |

The PCR reaction system consists of 6 μL 5× buffer, 1.2 μL dNTP, 1.2 μL reverse transcriptase, primers as mentioned above, single cell as a template, and add water up to a final volume of 30 μL.

The PCR reaction procedures are described as follows: reverse transcription 30 min at 50° C.; pre-denaturation 15 min at 95° C.; denaturation 40 s at 95° C., annealing 30 s at 55° C., elongation 1 min at 72° C. (40 cycles); elongation 10 min at 72° C.

b) Nested PCR

Using the reverse transcription product as a template to amplify H, K, and k genes through nested PCR (see Table 2 for primer sequences). The specific processes are described as follows:

TABLE 2

Nested PCR primers

| | Primers | Sequences |
|---|---|---|
| H: | VH3a-sense | SARGTGCAGCTCGTGGAG |
| | VH3b-sense | GAGGTGCAGCTGTTGGAG |
| | MuD | GGAATTCTCACAGGAGACGA |
| | PW-Cgamma | AGTAGTCCTTGACCAGGCAGCCCAG |
| κ | 5' Pan Vκ | ATGACCCAGWCTCCABYCWCCCTG |
| | 3' Cκ 494-516 | GTGCTGTCCTTGCTGTCCTGCT |
| λ | 5' AgeI Vλ 1 | CTGCTACCGGTTCCTGGGCCCAGTC TGTGCTGACKCAG |
| | 5' AgeI Vλ 2 | CTGCTACCGGTTCCTGGGCCCAGTC TGCCCTGACTCAG |
| | 5' AgeI Vλ 3 | CTGCTACCGGTTCTGTGACCTCCTA TGAGCTGACWCAG |
| | 5' AgeI Vλ 4/5 | CTGCTACCGGTTCTCTCTCSCAGCY TGTGCTGACTCA |
| | 5' AgeI Vλ 6 | CTGCTACCGGTTCTTGGGCCAATTT TATGCTGACTCAG |
| | 5' AgeI Vλ 7/8 | CTGCTACCGGTTCCAATTCYCAGRC TGTGGTGACYCAG |
| | 3' XhoI Cλ | CTCCTCACTCGAGGGYGGGAACAGA GTG |

The PCR reaction system contains: 2.5 µL of 10× buffer, 0.5 µL of 10 mM dNTP, 0.25 µL of DNA polymerase, primers as mentioned above, 1 µL of reverse transcription product, and add water up to a final volume of 25 µL. The PCR reaction procedures are described as follows: pre-denaturation 4 min at 94° C.; denaturation 30 s at 94° C., annealing 30 s at 57° C., elongation 45 s at 72° C. (40 cycles); elongation 10 min at 72° C.

c) Agarose Gel Electrophoresis

Figure 4:
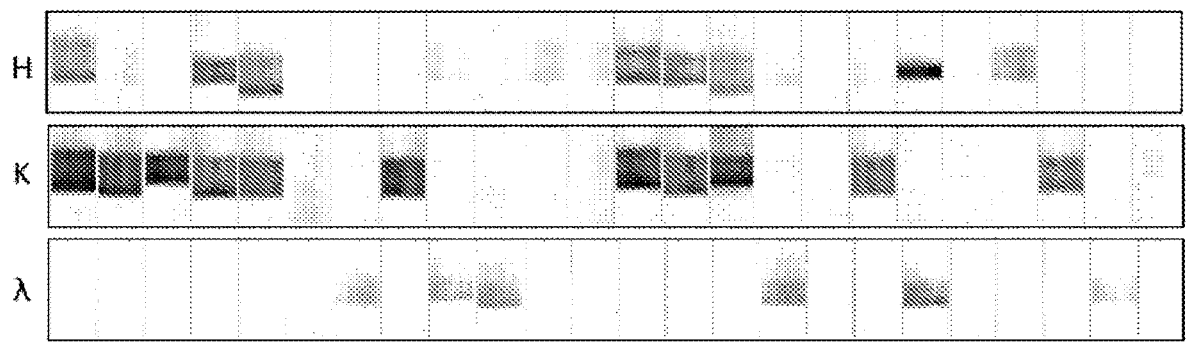
FIG. 4 Electrophoresis maps for identification of nested PCR amplified antibody gene.

A clone that successfully amplified both the heavy chain and light chain genes from a single cell is considered to be a successfully paired antibody. Pipette 5 µL of the nested PCR amplification product and analyze in 1% agarose gel electrophoresis. The paired positive clones are sequenced, and then the antibody variable regions are determined using Vector NTI software and IMGT website. Antibodies are expressed and followed by functional verifications. The agarose gel electrophoresis identification results of nested PCR amplification products of H, κ, and λ genes are shown in FIG. 4. Only when both the heavy and light chain variable region genes are amplified from a same memory B cell, they are considered to be naturally paired antibody genes, and then the corresponding nested PCR products are sequenced for further study.

7) Expression of Antibodies Through Linear Expression Cassettes

Through the above-mentioned reverse transcription reaction, 25 paired antibody sequences are obtained from single-cell clones. In view of the time-consuming and labor-intensive of traditional cloning and expression, the method of constructing linear expression cassettes can quickly express antibodies. The basic principle of this method is to directly fuse the promoter sequence (GenBank number: X03922.1), the coding sequence of the antibody leader sequence, the variable region sequence (obtained from single cell amplification), the constant region sequence (synthesized by Sangon Biotech), and a poly A tail (GenBank number: X03896.1). The linear forms of antibodies heavy and light chain genes are co-transfected into cells for expression. The specific method is described as follows:

a) Using pSec Tag2 (Invitrogen) as a Template to Amplify the Promoter-Leader Sequence Fragment and the Poly a Tail Fragment.

The PCR reaction system for amplifying the promoter-leader sequence fragment contains: 1 ng template plasmid pSec Tag2 (Invitrogen), 5 µL 10× buffer, 1 µL of 10 mM dNTP, 0.5 µL DNA polymerase, primer 5'CMV-F (CGATGTACGGGCCAGATATACGCGTTG), primer 3'leader-sequence (GTCACCAGTGGAACCTG-GAACCCA), and add water up to 50 µL. The PCR reaction system for amplifying the poly A tail fragment contains: 1 ng template plasmid pSec Tag2 (Invitrogen), 5 µL 10× buffer, 1 µL of 10 mM dNTP, 0.5 µL DNA polymerase, primer 5'POLY(A) (GCCTCGACTGTGCCTTCTAGTTGC), primer 3'POLY(A) (TCCCCAGCATGCCTGCTAT-TGTCT), and add water up to 50 µL.

The PCR reaction procedures are: pre-denaturation at 94° C. for 4 min; followed by 94° C. for 30 s, 60° C. for 30 s, 72° C. for 1 min (30 cycles); and finally elongation at 72° C. for 10 min.

b) Amplification of Antibody Constant Regions

The PCR system contains for amplifying the H chain constant region contains: 10 ng heavy chain constant region template, 5 µL 10× buffer, 1 µL of 10 mM dNTP, 0.5 µL DNA polymerase, primer 5'CH (ACCAAGGGCC-CATCGGTCTTCCCC), primer 3'CH (GCAACTAGAAG-GCACAGTCGAGGCTTTACCCGGAGACAGGGA), and add water up to 50 µL.

The PCR system contains for amplifying the κ chain constant region contains: 10 ng κ chain constant region template, 5 µL 10× buffer, 1 µL of 10 mM dNTP, 0.5 µL DNA polymerase, primer 5'CK (ACTGTGGCTGCAC-CATCTGTCTTC), primer 3'CK (GCAACTAGAAG-GCACAGTCGAGGCACACTCTCCCCTGTTGAAGCT), and add water up to 50 µL.

The PCR system contains for amplifying the λ chain constant region PCR system contains: 10 ng λ chain constant region template, 5 µL 10× buffer, 1 µL of 10 mM dNTP, 0.5 µL DNA polymerase, primer 5'Cλ (GAGGAGCTT-CAAGCCAACAAGGCCACA), primer 3'Cλ (GCAACTAGAAGGCACAGTCGAGGCTGAACAT-TCTGTAGGGGCCAC), and add water up to 50 µL.

The PCR reaction procedures are: pre-denaturation 4 min at 94° C.; followed by 94° C. for 30 s, 60° C. for 60 s, 72° C. for 3 min (30 cycles); and finally elongation at 72° C. for 10 min.

c) Amplification of Antibody Variable Regions

The PCR system contains: 10 ng reverse transcription PCR product, 5 µL 10× buffer solution, 1 µL of 10 mM dNTP, 0.5 µL DNA polymerase, the primers are shown in Table 3, and add water up to 50 µL.

The PCR reaction procedures are: pre-denaturation 4 min at 94° C.; followed by 94° C. for 30 s, 60° C. for 30 s, 72° C. for 3 min (30 cycles); and finally elongation at 72° C. for 10 min.

TABLE 3

| Primers for construction of linear expression cassettes | |
|---|---|
| H | Sequence |
| 5'VH1/5/7 | TGGGTTCCAGGTTCCACTGGT GACGAGGTGCAGCTGGTGCAG |
| 5'VH3 | TGGGTTCCAGGTTCCACTGGT GACGAGGTGCAGCTGGTGGAG |
| 5'VH3-23 | TGGGTTCCAGGTTCCACTGGT GACGAGGTGCAGCTGTTGGAG |
| 5'VH4 | TGGGTTCCAGGTTCCACTGGT GACCAGGTGCAGCTGCAGGAG |
| 5'VH4-34 | TGGGTTCCAGGTTCCACTGGT GACCAGGTGCAGCTACAGCAG TG |
| 5'VH1-18 | TGGGTTCCAGGTTCCACTGGT GACCAGGTTCAGCTGGTGCAG |
| 5'VH1-24 | TGGGTTCCAGGTTCCACTGGT GACCAGGTCCAGCTGGTACAG |
| 5'VH3-9/30/33 | TGGGTTCCAGGTTCCACTGGT GACGAAGTGCAGCTGGTGGAG |
| 5'VH6-1 | TGGGTTCCAGGTTCCACTGGT GACCAGGTACAGCTGCAGCAG |
| 3'JH1/2/4/5 | GGGGAAGACCGATGGGCCCTT GGTCGACGCTGAGGAGACGGT GACCAG |
| 3'JH3 | GGGGAAGACCGATGGGCCCTT GGTCGACGCTGAAGAGACGGT GAC CATTG |

TABLE 3-continued

Primers for construction of linear expression cassettes

| | |
|---|---|
| 3'JH6 | GGGGAAGACCGATGGGCCCTTGGTCGACGCTGAGGAGACGGTGACCGTG |
| 5'CH | ACCAAGGGCCCATCGGTCTTCCCC |

| κ | Sequence |
|---|---|
| 5'Vκ1 | TGGGTTCCAGGTTCCACTGGTGACGACATCCAGATGACCCAGTC |
| 5'Vκ1-9/1-13 | TGGGTTCCAGGTTCCACTGGTGACGACATCCAGTTGACCCAGTCT |
| 5'Vκ1D-43/1-8 | TGGGTTCCAGGTTCCACTGGTGACGCCATCCGGATGACCCAGTC |
| 5'Vκ2 | TGGGTTCCAGGTTCCACTGGTGACGATATTGTGATGACCCAGAC |
| 5'Vκ2-28/2-30 | TGGGTTCCAGGTTCCACTGGTGACGATATTGTGATGACTCAGTC |
| 5'Vκ3-11/3D-11 | TGGGTTCCAGGTTCCACTGGTGACGAAATTGTGTTGACACAGTC |
| 5'Vκ3-15/3D-15 | TGGGTTCCAGGTTCCACTGGTGACGAAATAGTGATGACGCAGTC |
| 5'Vκ3-20/3D-20 | TGGGTTCCAGGTTCCACTGGTGACGAAATTGTGTTGACGCAGTCT |
| 5'Vκ4-1 | TGGGTTCCAGGTTCCACTGGTGACGACATCGTGATGACCCAGTC |
| 3'Jκ1/2/4 | GAAGACAGATGGTGCAGCCACAGTACGTTTGATYTCCACCTTGGTC | d) Purification of PCR Products:

After analyzed in 1% agarose gel electrophoresis, the above PCR products are purified using the Gel Extraction Kit (OMEGA).

e) Amplification of the Heavy and Light Chain Linear Expression Cassettes

Figure 5:
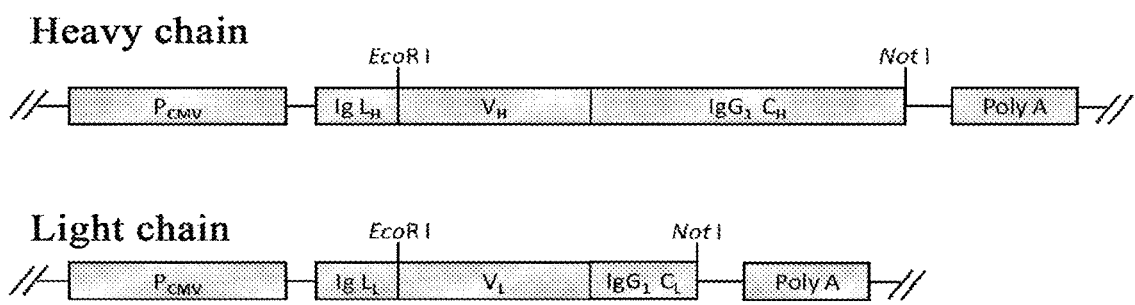
FIG. 5 Schematic diagram of the linear expression cassettes.

A schematic diagram of the linear expression cassette is shown in FIG. 5. In FIG. 5, PcMv is the promoter; Ig $L_{H/L}$ is the heavy or light chain leader sequence; $V_{H/L}$ is the heavy or light chain variable region; IgG1 $C_{H/L}$ is the heavy or light chain constant region; Poly A is the poly-A tail; EcoR I and Not I are restriction enzyme cleavage sites.

The PCR reaction system contains:

10 ng purified promoter-leader sequence fragment, 10 ng heavy chain/light chain variable region fragment, 10 ng heavy chain/light chain constant region fragment, 10 ng poly A tail fragment, 2.5 μL 10× buffer, 0.5 μL of 10 mM dNTP, 0.25 μL DNA polymerase, primer 5'CMV-F (CGATGTACGGGCCAGATATACGCGTTG), 3'POLY(A) (TCCCCAGCATGCCTGCTATTGTCT), and add water up to 25 μL.

The PCR reaction procedures are: pre-denaturation 4 min at 94° C.; followed by 94° C. for 30 s, 60° C. for 30 s, 72° C. for 3 min (30 cycles); and finally elongation at 72° C. for 10 min.

f) Purification of PCR Products:

PCR products are directly purified using Gel Extraction Kit (OMEGA).

g) DNA Quantification:

PCR products are quantified using NanoVue Plus (GE Healthcare).

h) Cell Seeding:

293T cells are seeded into 24-well cell culture plates at a density of $2 \times 10^5$/mL and then incubated overnight at 37° C. in a cell incubator containing 5% $CO_2$.

i) Co-Transfection:

On the next day, 1 μg each of the paired heavy and light chain linear expression cassettes is mixed with 4 μL of Turbofect (Thermo Scientific, R0531) transfection reagent in 200 μL serum-free MEM medium. The mixture is incubated for 15-20 min at room temperature and added dropwise to the 293T cells that are cultured overnight. After expression for 48 hours at 37° C., 5% $CO_2$, the supernatant is collected for binding identification.

8) Screening of GP-Specific Antibodies by ELISA a) Microplates (Corning, 9018) are coated with 100 μL of EBOV GPdTM at 1 μg/mL and incubated overnight at 4° C. in a humid box.
b) On the following day, plates are washed 5 times with a plate washer (BIO-TEK, 405_LS).
c) Block plates with 100 μL of blocking buffer at room temperature for 1 h.
d) Wash 5 times.
e) Add 100 μL of the transfected cell culture supernatant to wells and incubate at room temperature for 1 h.
f) Wash 5 times.
g) Add 100 μL of goat anti-human IgG Fc-HRP (Abcam, Ab97225) at a dilution of 1:10,000 to wells, and incubate plates at room temperature for 1 h.
h) Wash 5 times.
i) Plates are incubated with 100 μL of 3,3',5,5'-tetramethylbenzidine substrate for 6 min in the dark at room temperature, followed by addition of 50 μL stop solution.
j) Read the optical density at a dual-wavelength of 450 nm and 630 nm on a Spectramax 190 reader.

Figure 6:
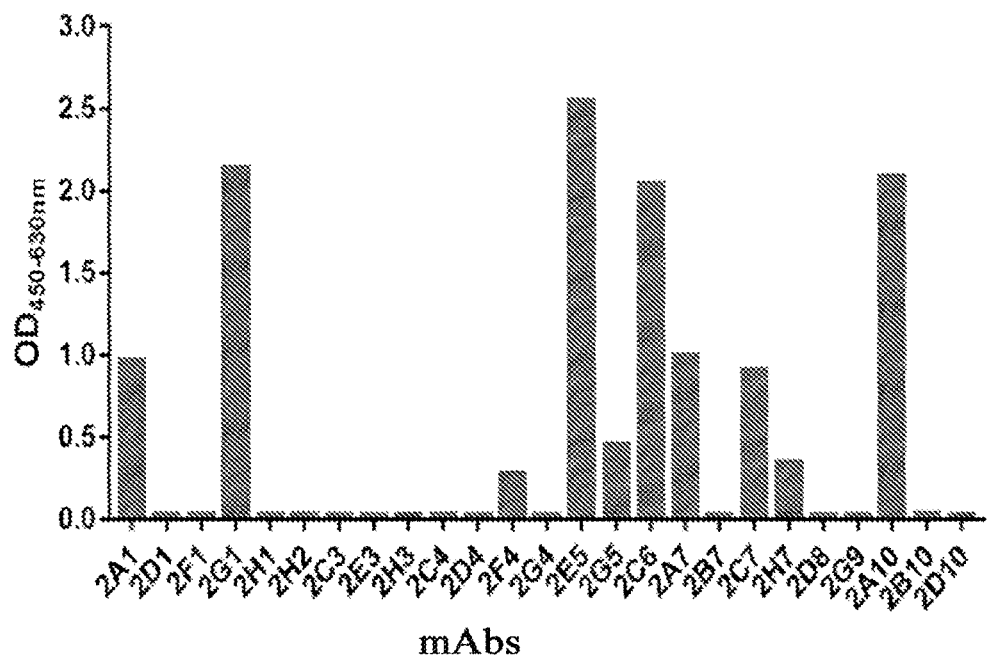
FIG. 6 Binding activity of screened antibodies.

Results:

Among 25 antibodies, 10 Ebola GP specific antibodies are identified, including 2A1, 2G1, 2F4, 2E5, 2G5, 2C6, 2A7, 2C7, 2H7, and 2A10. The relative binding activities of 25 monoclonal antibodies is shown in FIG. 6.

9) Screening of Antibodies with Broad-Spectrum Binding Activity by ELISA

In order to obtain antibodies with a broad spectrum of binding to multiple Ebolaviruses, the cross-reactivity of antibodies is analyzed. The day before the experiment, 96-well ELISA plates are coated with 1 μg/mL EBOV GP, BDBV GP, SUDV GP or RESTV GP. The subsequent procedures are same as described in step 8).

Figure 7:
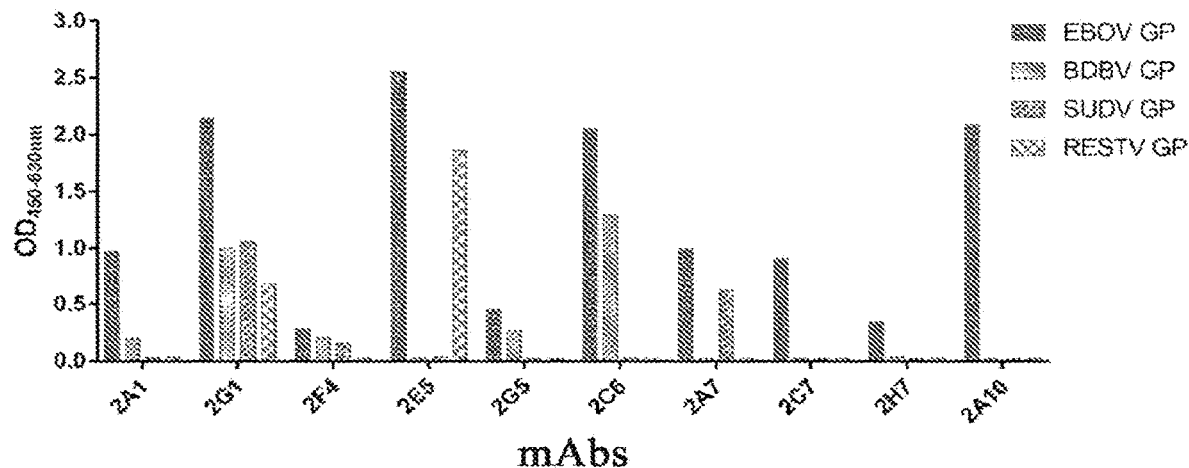
FIG. 7 Analysis on Broad-spectrum of the binding of antibodies to antigens.

The results are shown in FIG. 7. Among the 10 strains of EBOV GP binding antibodies, 7 antibodies have broad-spectrum binding activity and can at least bind two kinds of Ebolavirus GPs. 2A1, 2G5, 2C6 bind EBOV GP and BDBV GP; 2G1 bind EBOV GP, BDBV GP, SUDV GP, and RESTV GP; 2F4 bind EBOV GP, BDBV GP, and SUDV GP; 2E5, 2A7 bind EBOV GP and RESTV GP; 2C7, 2H7 and 2A10 only bind EBOV GP without broad-spectrum ability. Among them, 2G1 has the best broad-spectrum, and can well bind all the four Ebolavirus GPs we have tested.

10) Sequence Description of 2G1

2G1 has good broad-spectrum binding activity, and its sequence is described as follows:

The amino acid sequence of the light chain variable region is shown in SEQ ID NO. 1. CDR1, CDR2, and CDR3 of the light chain variable region have the amino acids 27-32, 50-52, and 89-96 of SEQ ID NO. 1, respectively. The coding sequence of variable region of light chain is shown in SEQ ID NO. 2. The amino acid sequence of the light chain constant region is shown in SEQ ID NO. 3, and the coding sequence of the light chain constant region is shown in SEQ ID NO. 4.

The amino acid sequence of the heavy chain variable region is shown in SEQ ID NO. 5. CDR1, CDR2, and CDR3 of the heavy chain variable region have the amino acids 26-33, 51-58, and 97-113 of SEQ ID NO. 5, respectively. The coding sequence of variable region of heavy chain is shown in SEQ ID NO. 6. The amino acid sequence of the heavy chain constant region is shown in SEQ ID NO. 7, and the coding sequence of the heavy chain constant region is shown in SEQ ID NO. 8.

11) Construction of Expression Plasmids and Preparation of Antibody

The expression plasmid of 2G1 is constructed and then expressed for antibody preparation. The method is described as follows:

a) The full-length genes of 2G1H and 2G1K linear expression cassettes are digested with EcoR I (NEB, R3101) and Not I (NEB, R3189) before ligated to pcDNA3.4 expression plasmids.

b) 15 µg each of pcDNA3.4-2G1H and pcDNA3.4-2G1K are co-transfected to 30 mL Expi293 system (Life, A14524), and cells are cultured at 125 rpm, 5% $CO_2$ for 72 h.

c) The expression supernatant is collected by centrifugation at 3000×g for 10 min. After filtered through a 0.22 µm syringe filter, antibody is purified using a HiTrap rProtein A column.

d) The concentration of 2G1 is determined using BCA protein quantification kit (Thermo Scientific, 23225) after buffer-exchanged into PBS.

Example 2. Detection of Antibody Binding Activity by ELISA

1) Coat the 96-well plates with 100 µL of EBOV GP, BDBV GP, SUDV GP or RESTV GP at a concentration of 1 µg/mL. Incubate the plates in a humid box at 4° C. overnight.
2) Wash plates 5 times.
3) Add 100 µL of blocking solution to each well and incubate at room temperature for 1 h.
4) Wash plates 5 times.
5) Add 150 µL of 2G1 at a concentration of 10 µg/mL to the first well, and add 100 µL of dilution solution to the remaining wells. Transfer 50 µL from the first well to the second well, and so on, dilute at a gradient of 1:3, with a final volume of 100 µL per well. Incubate plates for 1 h at room temperature.
6) Wash plates 5 times.
7) Add 100 µL of HPR-Conjugated goat anti-human IgG secondary antibody at a 1:10,000 dilution to each well. Incubate plates for 1 h at room temperature.
8) Wash plates 5 times.
9) Add 100 µL of TMB solution to each well, incubate for 6 min in the dark at room temperature, then add 50 µL of stop solution to stop the reaction.
10) Detect the OD value at 450-630 nm on the microplate reader.

Figure 8:
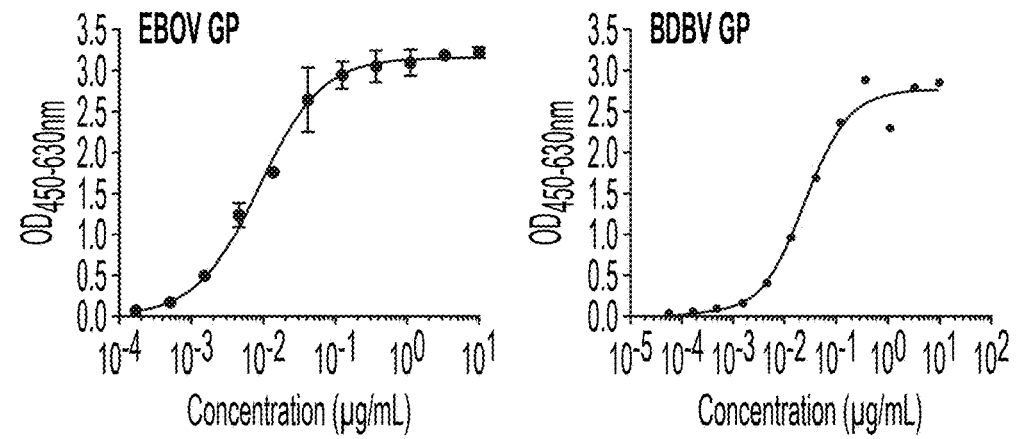
FIG. 8 Binding curves of 2G1 with different GP antigens.
Figure 8:
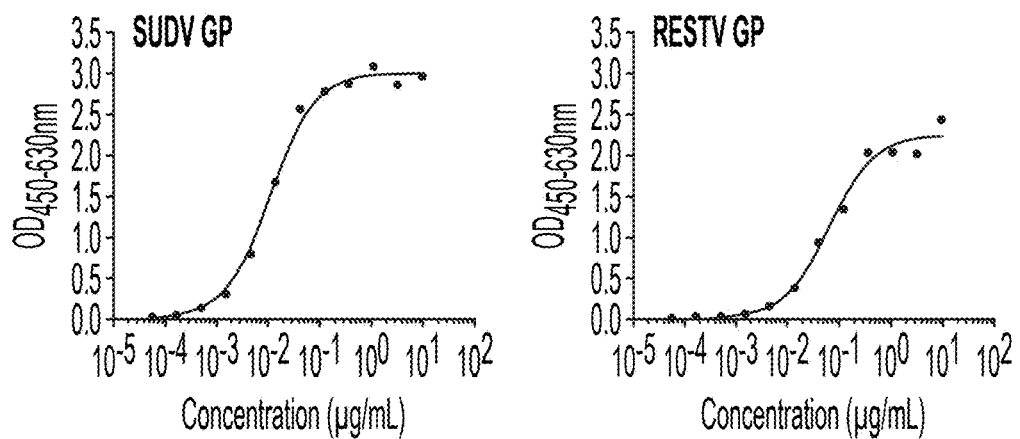

Results:

Monoclonal antibody 2G1 has good binding activity to EBOV GP, BDBV GP, SUDV GP, and RESTV GP, with $EC_{50}$ values of 0.0059 µg/mL, 0.0075 µg/mL, 0.0048 µg/mL, and 0.026 µg/mL, respectively (data as shown in FIG. 8).

Example 3. Affinity Determination

Figures 9, 10:
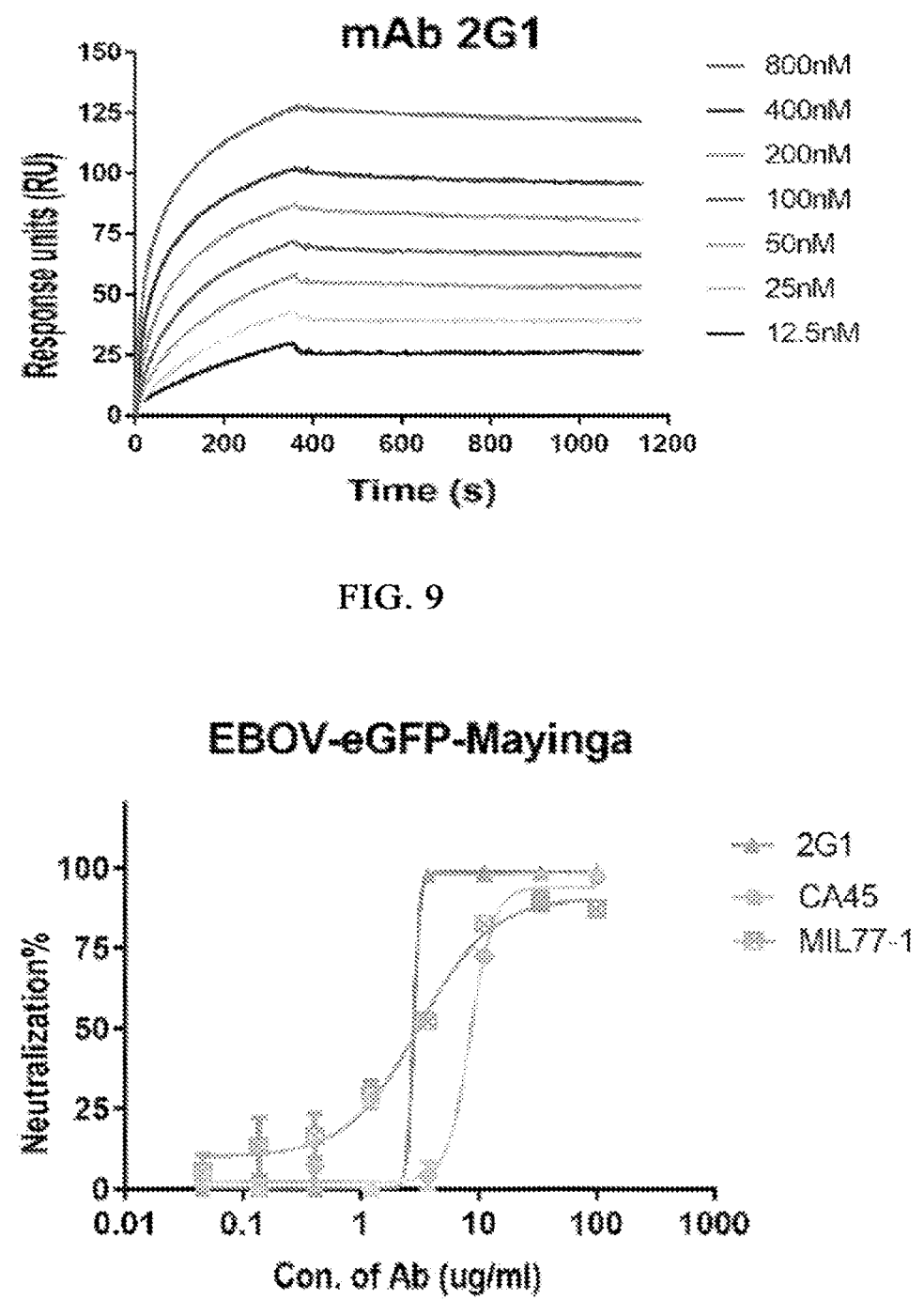

The affinity of 2G1 to GPdMucin is determined by BIACORE 3000. Firstly, the anti-human IgG Fc antibody is covalently coupled to a CM5 sensor chip. 2G1 is used as a ligand at a concentration of 1 µg/mL and bind for 30 s at a flow rate of 10 L/min. The injection needle and integrated fluidic circuit (IFC) microfluidic system are cleaned with HEPES buffer at a flow rate of 30 L/min. GPdMucin is used as an analyte at seven concentrations of 800 nM, 400 nM, 200 nM, 100 nM, 50 nM, 25 nM, and 12.5 nM, respectively. Each concentration of GPdMucin binds for 6 min at a flow rate of 30 µL/min and then dissociates for 30 min. The chip is regenerated before the concentration of analyte is changed. The final data curves are fitted and analyzed by BIA evaluation software (as shown in FIG. 9).

The software analysis calculated the association rate constant (Ka) of 2G1 is $5.11 \times 10^4$ (1/Ms), the dissociation rate constant (Kd) is $3.75 \times 10^{-5}$ (1/s), and the affinity constant $KD = 7.34 \times 10^{-10}$ (M). 2G1 has a level of sub-nanomolar affinity to GPdMucin.

Example 4. Evaluation of Broad-Spectrum Neutralizing Activity of 2G1 Using HIV-EBOV/BDBV/SUDV-Luc Pseudovirus Packaged EBOV, BDBV and SUDV pseudoviruses based on HIV backbone to evaluate the neutralizing activity of 2G1 in vitro. The evaluation method is described as below:

1) Dilute 2G1 with DMEM medium, add 75 µL of antibody at 100 µg/mL to the first well of 96-well tissue culture plates, and add 50 µL of DMEM medium to the remaining wells.
2) Transfer 25 µL of liquid from the first well into the second well, mix well, and so on, dilute at a ratio of 1:3, and the final volume of each well is 50 µL.
3) Dilute the pseudovirus with DMEM medium at a dilution of 1:5 (control the luciferase value of the negative contrast to 20,000~100,000). Add 50 µL pseudovirus to each well and incubate at 37° C. for 1 h.
4) Count 293T cells and seed 100 µL cells at a density of $2 \times 10^5$ cells/mL to each well.
5) Incubate plates at 37° C. for 36~48 h.
6) Take out plates, carefully remove the medium. Add 100 µL of cell lysate to each well and shake at 350 rpm for 15 min on a shaker.
7) Centrifuge at 3000 rpm for 10 min at room temperature.
8) After mixing the detection substrate and buffer of the luciferase detection system (Promega, E1501), fill the GLOMAX 96 MICROPLATE LUMINOMETER (Promega) detection loops.
9) Transfer 20 µL of the lysis supernatant and read the fluorescence value. Calculate the protection rate of the antibody to the cells.

Results:

Compared with the control antibody, 2G1 can effectively neutralize EBOV, BDBV, and SUDV pseudoviruses in vitro. The neutralizing ability of 2G1 increases with the increase of concentration, and the protection of 2G1 to three pseudotyped Ebolaviruses can nearly reach to 100% at a concentration of 1 µg/mL (as shown in FIG. 11).

Example 5. Evaluation of 2G1 Neutralization Capacity Using EBOV-eGFP Authentic Virus Seed Vero E6 cells into 96-well tissue culture plates (Corning) and ready to infect when density reach to 85%~90%. Pre-incubate 100 PFU of EBOV-eGFP-Mayinga virus with antibodies 2G1, CA45, and MIL77-1, respectively, in blank DMEM at 37° C. for 1 h. Antibodies are diluted at 1:3 ratio starting at 100 µg/mL. Add the virus-antibody mixture to Vero E6 cells and infect at 37° C., 5% $CO_2$ for 1 h before replace medium with fresh DMEM containing 12% FBS. After incubating for 48 h, cells are fixed with 10% phosphate buffered formalin (Fisher). Use iSpot FluoroSpot Reader System (Advanced Imaging Devices) to count fluorescent plaques.

In the EBOV-eGFP-Mayinga authentic virus neutralization test, the $IC_{50}/IC\,90$ value of 2G1 is 2.80 µg/mL and 3.23 µg/mL, respectively; the $IC_{50}/IC_{90}$ value of CA45 is 8.51 µg/mL and 12.99 µg/mL, respectively; the $IC_{50}/IC_{90}$ value of MIL77-1 is 3.12 µg/mL and 82.01 µg/mL, respectively. For EBOV-eGFP-Mayinga authentic virus, 2G1 shows better in vitro neutralization ability than control antibodies (as shown in FIG. 10).

Example 6. Analysis of 2G1 Binding Domain Using Truncated GPs

Figure 12:
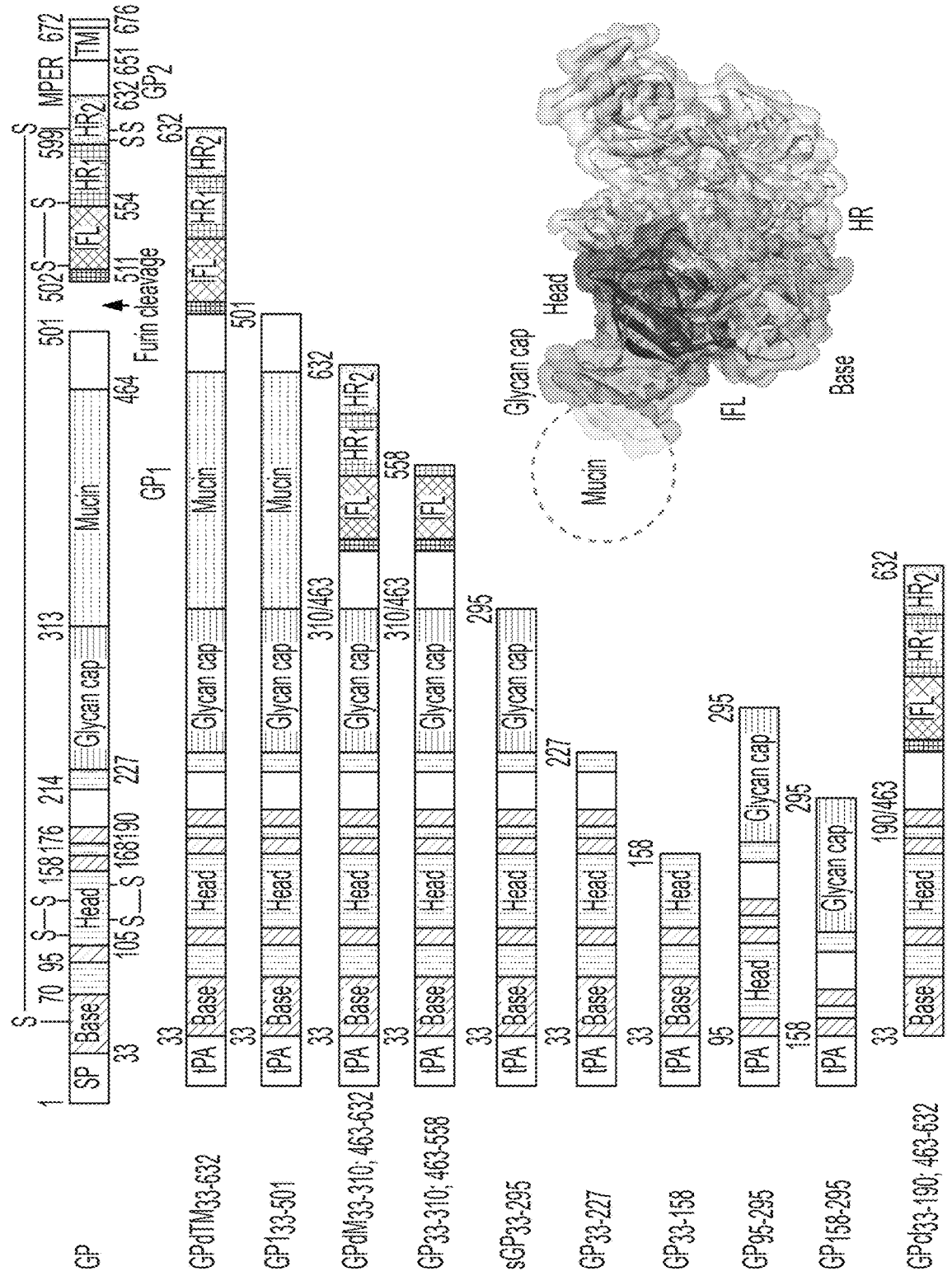
FIG. 12 Construction diagram of truncated GPs.

According to the structural and functional characteristics, GP can be divided into multiple domains including glycan cap, mucin like domain, receptor binding region, internal fusion loop, HR region, and so on. Since 2G1 exhibits a good broad-spectrum neutralization ability, and several truncated GPs are designed to analyze its approximate binding region. In addition to the well-known GPdTM, GPdMucin, GP1, sGP and $GP_{CL}$ in the reports, several new forms are produced including: $GP_{33-310;\,463-558}$, $GP_{33-227}$, $GP_{33-158}$, $GP_{95-295}$, $GP_{227-295}$. $GP_{33-310;\,463-558}$, resulting from a removal of the heptad repeat region on GPdMucin backbone; $GP_{33-227}$, comprising a truncated sGP without the glycan cap (GC) domain; $GP_{33-158}$, comprising most of the base and head domains; $GP_{95-295}$, a sGP variant without the base region; $GP_{158-295}$, a sGP variant without the base region and the head region; $GP_{227-295}$, comprising only the most part of the glycan cap. $GP_{CL}$ is obtained by removing the glycan cap by thermolysin on the basis of GPdMucin, without the need to construct an expression plasmid. The structure diagram of truncated GPs are shown in FIG. 12.

The method using truncated GPs to analyze the 2G1 binding region is described as follows:

1) According to the schematic diagram, amplify each truncated GP gene fragment from the full-length GP sequence. Add a 6× His tag to the gene carboxyl terminal and then connect the fragment to the pcDNA3.4 plasmid.
2) Truncated GPs are expressed in the Expi293 system, and the target protein is purified by NI-NTA method.
3) Analyze the binding activity of 2G1 to truncated GPs using a same method described in example 2.

Figure 13:
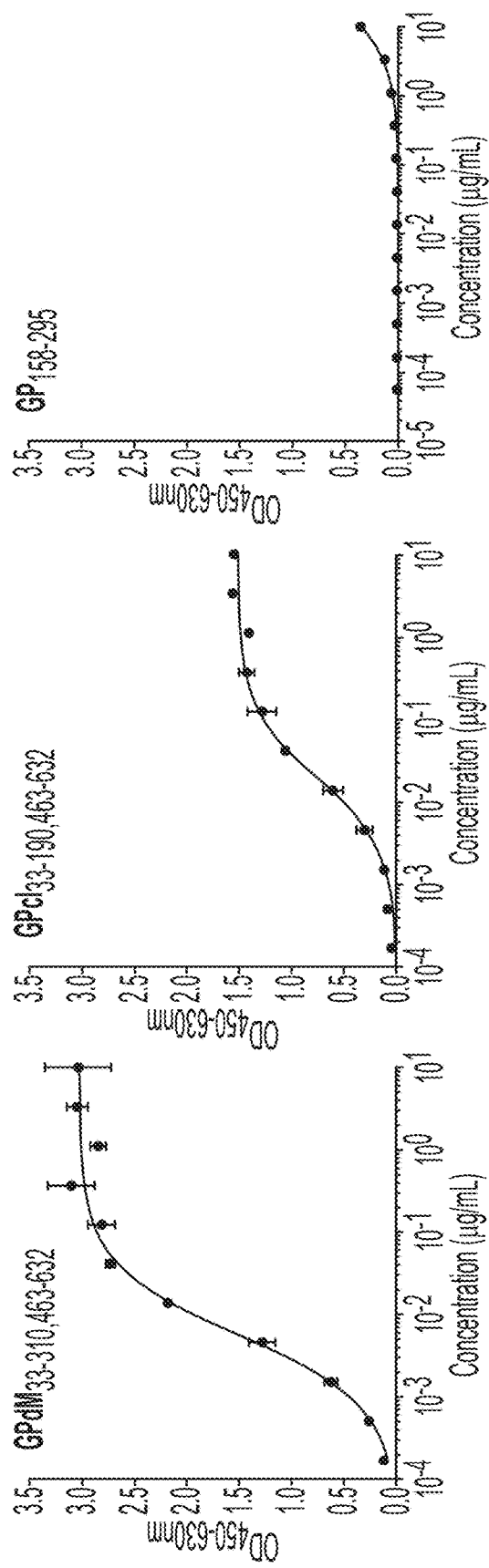
FIG. 13 Binding curves of 2G1 to truncated antigens (1)
Figure 13:
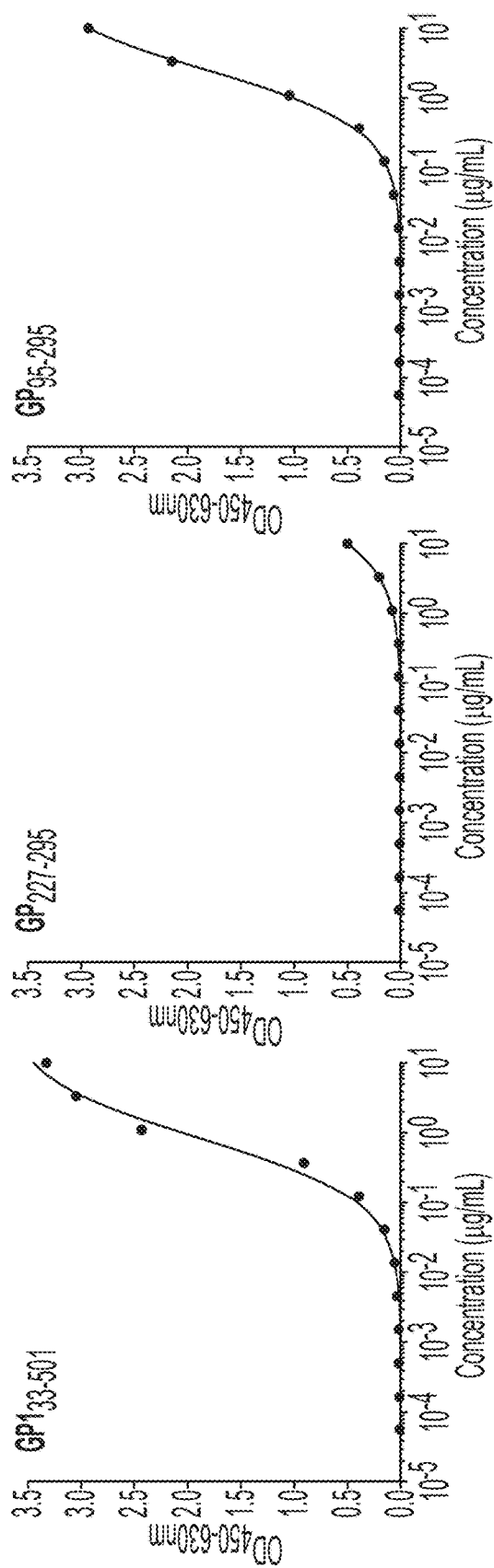
Figure 14:
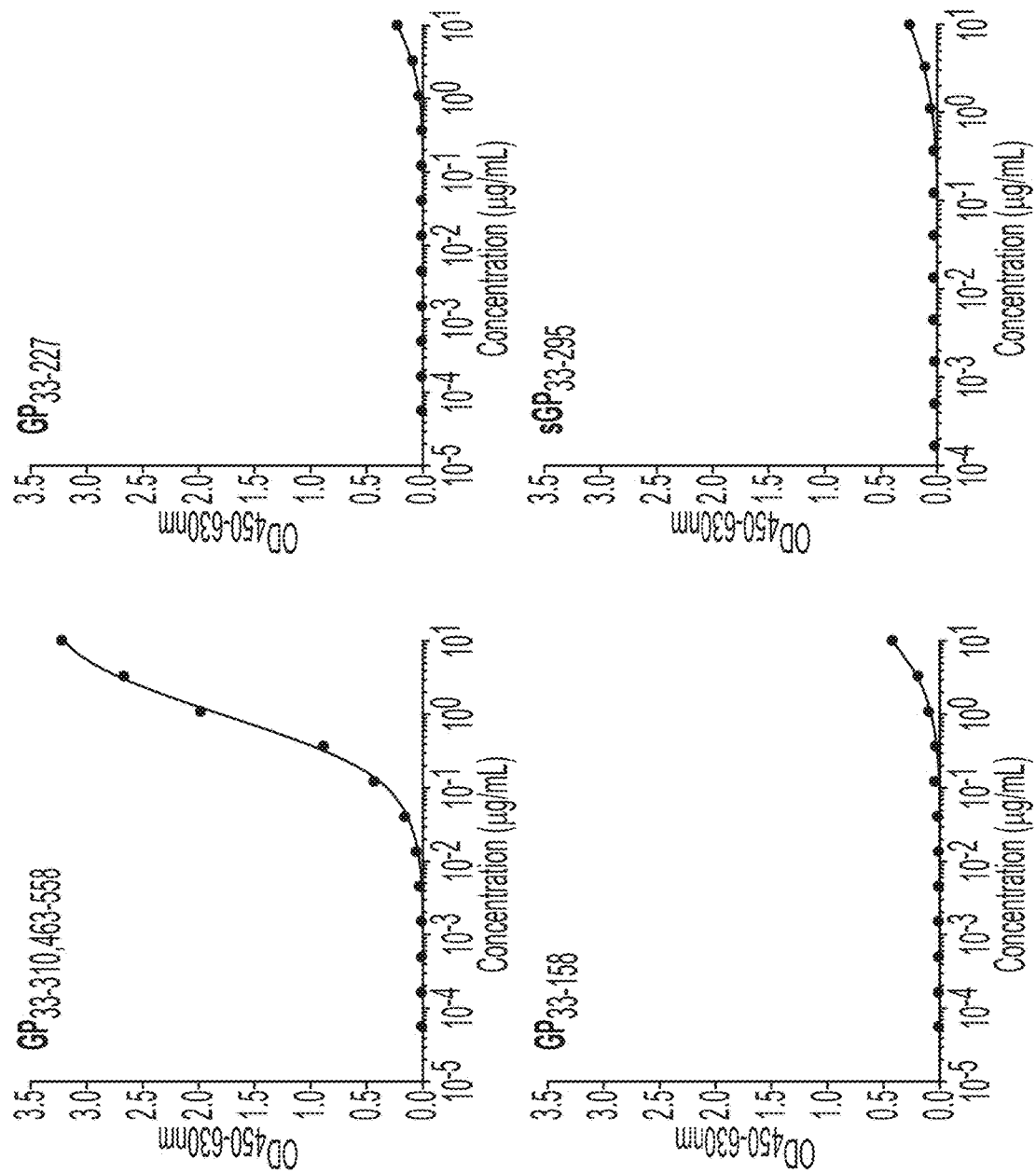
FIG. 14 Binding curves of 2G1 to truncated antigens (2)

Results:

The binding $EC_{50}$ value of 2G1 to GPdMucin is 0.0037 µg/mL, which is basically same as the value to GPdTM. The binding $EC_{50}$ value of 2G1 to $GP_1$ is 0.8075 µg/mL, which is more than 100 times lower than GPdTM and GPdMucin, suggesting that the GP2 subunit plays a key role for binding of 2G1. Although the maximum binding of 2G1 to $GP_{CL}$ is reduced to about half of the maximum binding to GPdTM, its $EC_{50}$ value is 0.019 µg/mL without obvious reduce. $GP_{CL}$ contains the whole GP2 subunit and part of the GP1 subunit, while sGP contains the part of $GP_{CL}$ on the GP1 subunit. However, 2G1 cannot bind sGP, which further emphasizes the importance of GP2 for 2G1 recognition. Relativities of 2G1 to truncated GPs are shown in FIG. 13 and FIG. 14.

Example 7

Competitive binding ELISA is conducted to analyze the epitopes of 2G1. Other neutralizing antibodies and MIL77-1/2/3 with the known binding epitopes are used as contrasts. Whether or not there is overlapped epitopes between the detecting antibody and the competitive antibody incubated together is determined by the result whether or not the binding of the detecting antibody to GP is blocked by the competitive antibody. Methods are described as below:

1) Dissolve 4 mg of biotin (Thermo Scientific, 21335) in 2 mL of ultrapure water to a concentration of 2 mg/mL.
2) Dilute 200 µg of 2G1, 2E5, 5D7, 5G11, 5B12, 1B3, MIL77-1, MIL77-2, and MIL77-3 in 200 µL PBS, respectively.
3) Label antibodies with a 20-fold molar excess of biotin at room temperature for 1 h. Biotinylated antibodies are buffer-exchanged more than 3 times with PBS through a 50 kDa, 0.5 mL centrifugal filter to remove excess biotin.
4) Use PBS dilute the biotinylated antibodies to a final volume of 100 µL (the purpose is to control a similar concentration), and determine the antibody concentration.
5) The 96-well ELISA plates are coated with GPdMucin at a concentration of 1 µg/mL overnight at 4° C.
6) Wash ELISA plates. Add 100 µL of blocking solution to each well and incubate at 37° C. for 1 h.
7) In the experiment, non-biotin-labeled antibodies are used as competitors and the signal of biotinylated antibodies is to be detected. Dilute the competing/detecting antibodies to 2.5 µg/mL and 25 ng/mL, respectively. 8) Wash plates. Add each of 50 µL of detecting antibody and competing antibody to wells.
9) Wash plates. Dilute streptavidin antibody (Thermo Scientific, 21126) at 1:1000, add 100 µL to each well and incubate at 37° C. for 1 h.
10) Wash plates, Add 100 µL TMB solution to each well. Incubate plates in the dark for 6 min and then stop the reaction with 50 µL stop solution. 11) Read the OD value at 450-630 nm.

Results:

The competitive binding value is calculated through following formula:

$$\text{Competition value} = \frac{\text{Biotinylated antibody binding in the presence of competitors}}{\text{Biotinylated antibody binding in the presence of an irrelevant antibody}} \times 100\%$$

Figures 15, 16:
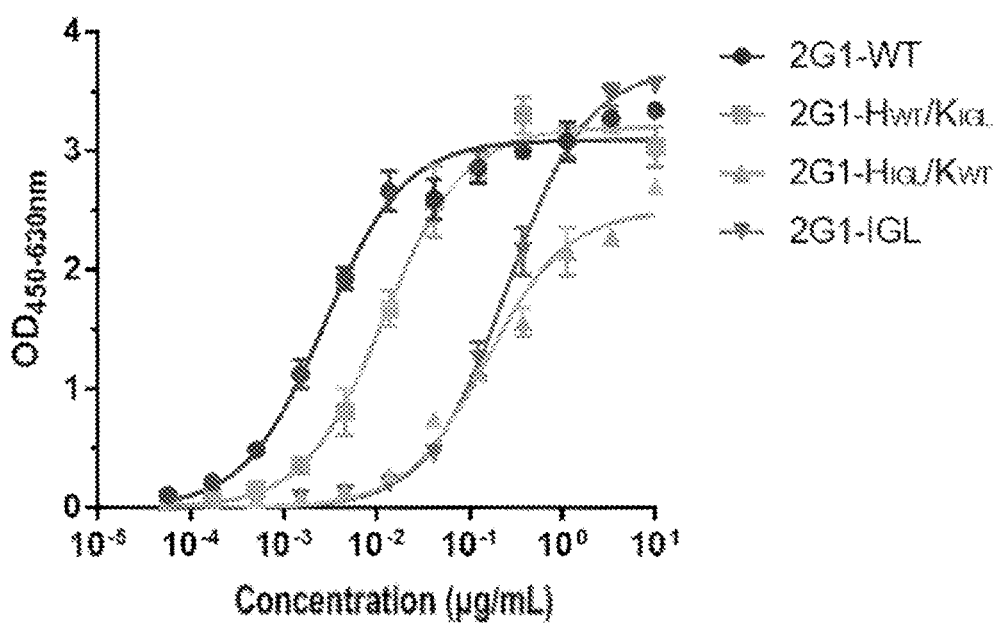
FIG. 15 Schematic diagram of competitive binding value between antibodies.
FIG. 16 Detection of binding activities of rematched or wild-type 2G1 to GP by ELISA.

There is a strong competition if the value is <30, weak competition if the value is between 30 and 60, and non-competition if the value is >60. Antibodies can be well blocked by themselves, and these antibodies can be divided into four groups based on the competition data. Among them, there are two groups bind to the $GP_1$ and GP2 subunit, respectively. There is barely no competition between 2G1 and other antibodies binding to the GP2 subunit, including the non-neutralizing antibody 5B12 and the neutralizing antibody MIL77-1/2. The competition data indicates that the epitopes of 2G1 are different from control antibodies, suggesting that 2G1 has the potential to form a cocktail combination therapy with other neutralizing antibodies. (Competition data as shown in FIG. 15).

Example 8. Epitope Prediction Through Discovery Studio and LigPlot+

Dock the antigen with antibody molecules using a Dock Proteins (ZDOCK) protocol in Discovery Studio 4.5. The structure of EBOV GP (PDB ID: 5KEL) is used as the receptor and the homologous constructed model of antibody 2G1-Fab is defined as the ligand. A total of 54,000 docking simulation poses of antigen-antibody complexes are generated following the ZDOCK rigid docking algorithm. Combined with the ZRANK scoring algorithm for ranking, 2000 poses are selected.

Calculate the following characteristic values of the antigen-antibody interface of each docking simulation conformation.

$X_3$, the epitope-paratope interface index (EPII)
$X_4$, the buried surface area
$X_5$, the density of the cation-$\pi$ interactions
$X_6$, atomic density index (ADI)

Take the ZDOCK score and ZRANK score given by Discovery Studio 4.5 as the feature values $X_1$ and $X_2$, respectively. The probability value of the multiple linear regression (MLR probability) is calculated according to the following formula:

$$MLR \text{ probability} = \frac{1}{1+\exp[-(-6.3591 + 2.2188X_1 - 6.7498X_2 - 13.0166X_3 - 13.4489X_4 + 2.7955X_5 - 11.2194X_6)]}$$

The 2,000 docking simulation conformations are reordered in descending order of MLR probability, and the first 10 poses are listed. Among them, pose_96 ranks first, and the score value is much higher than other poses (as shown in FIGS. 17 A and B).

Figure 17A:
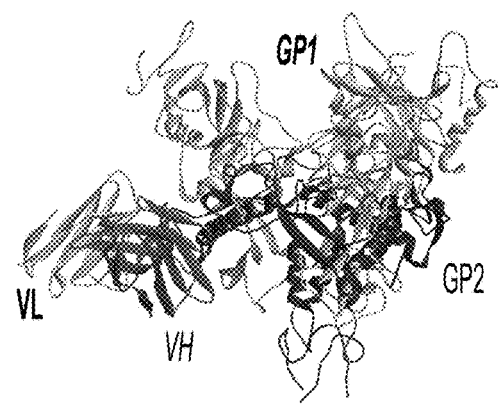
FIG. 17 Prediction and analysis by Discovery Studio and LigPlot+ software (1)
Figure 17B:
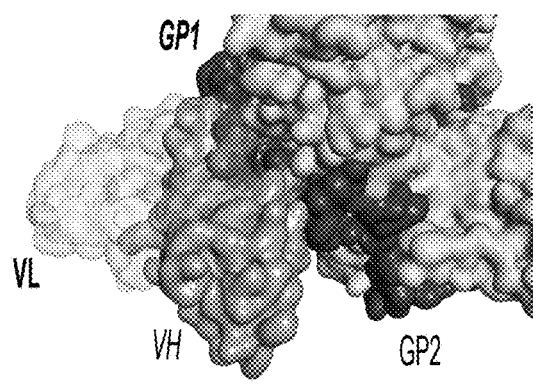
Figure 17C:
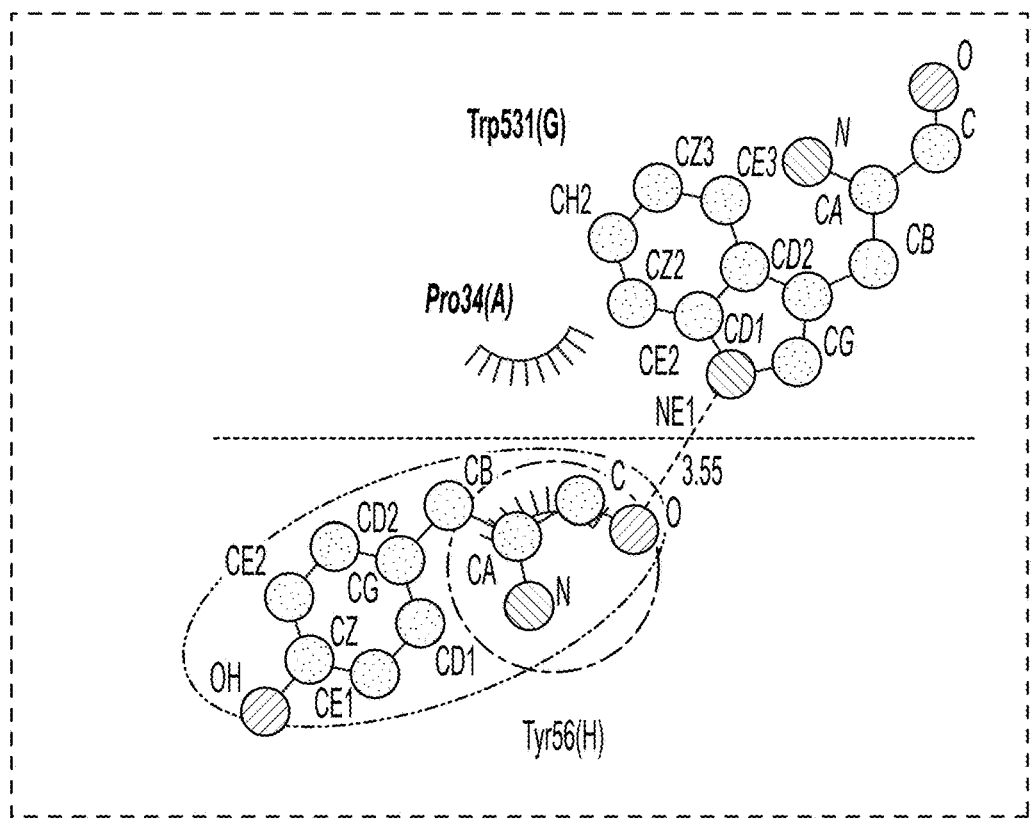
Figure 18:
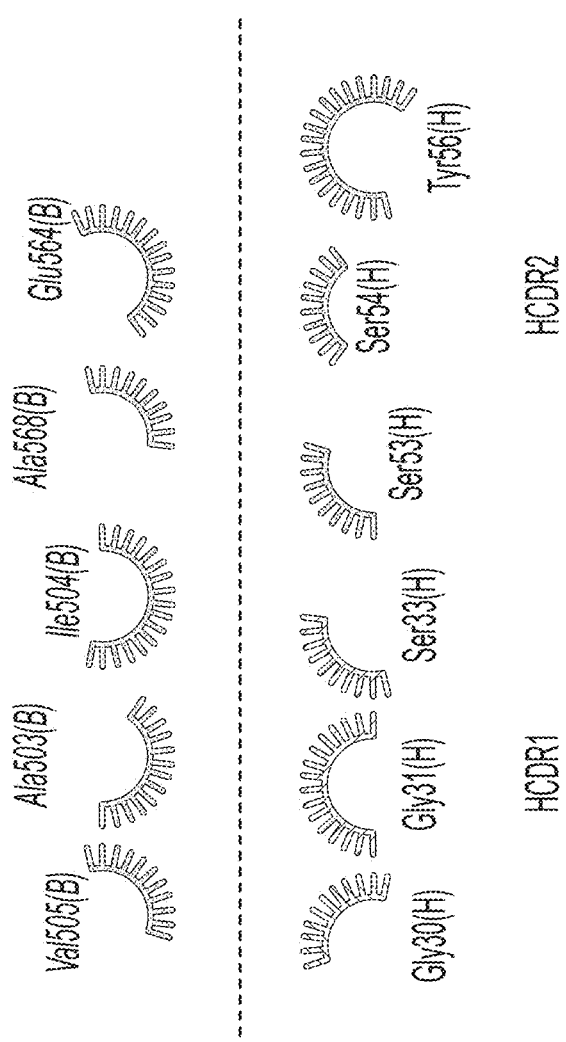
FIG. 18 Prediction and analysis by Discovery Studio and LigPlot+ software (2)
Figure 18:
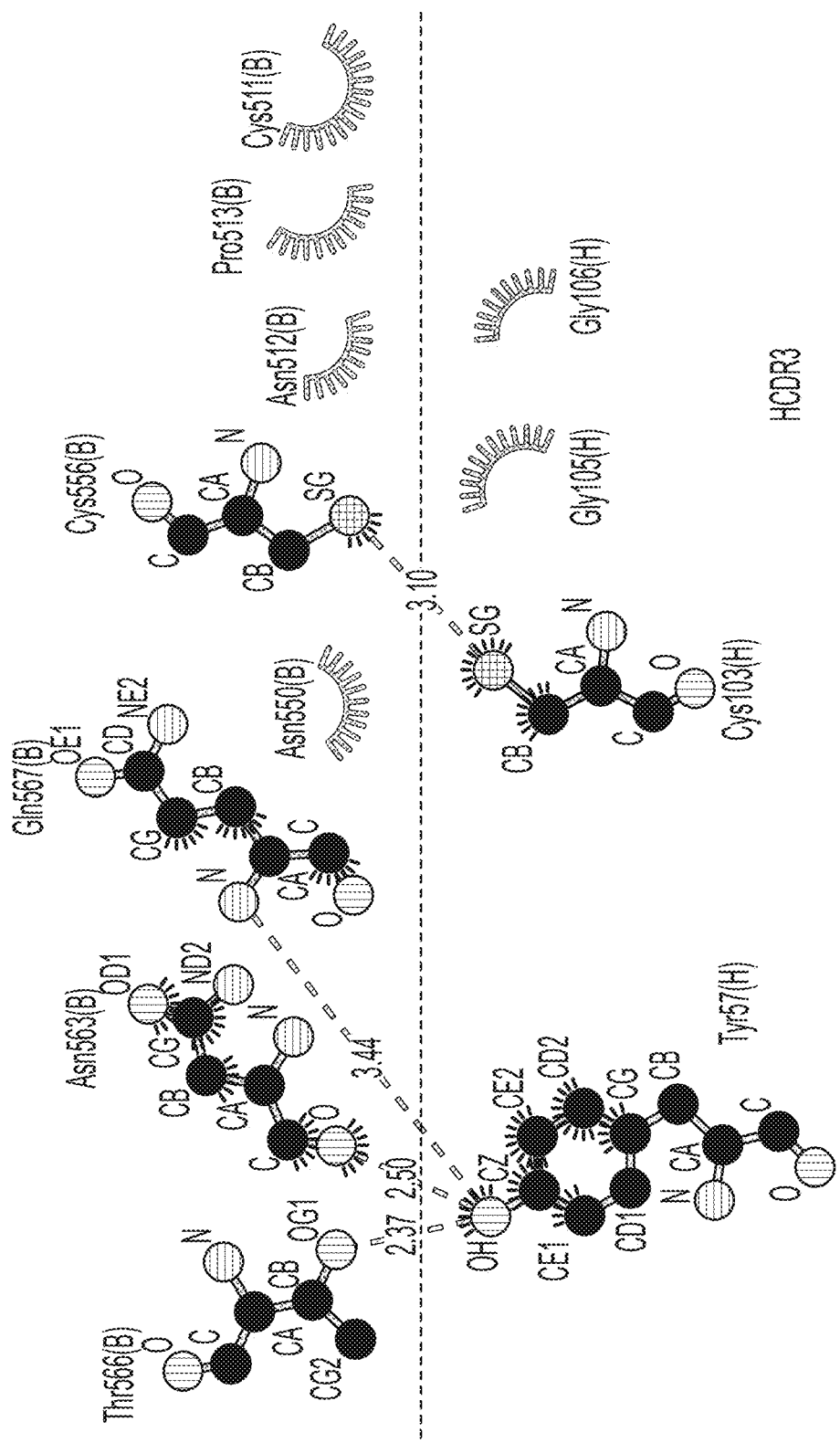
Figure 18:
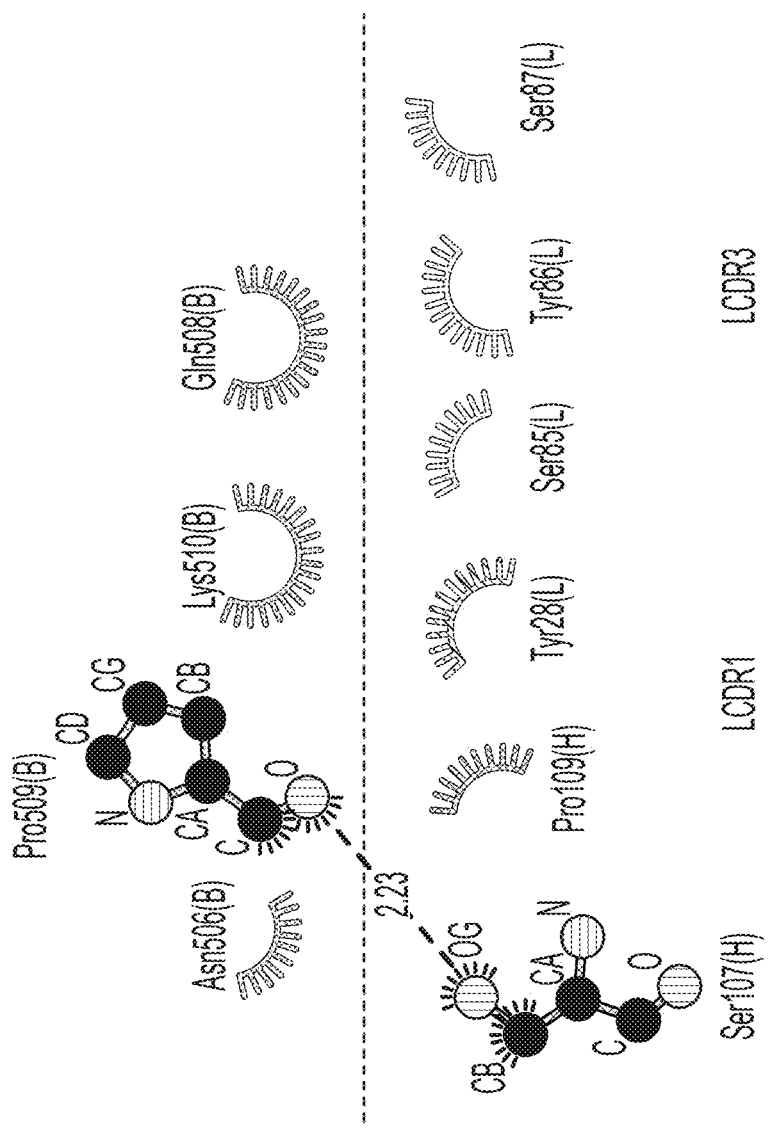

The pose_96 is further analyzed with LigPlot+ software, and the amino acids and possible interactions on the binding interface of GP and 2G1 are predicted (as shown in FIG. 17 C and FIG. 18). Amino acids such as 563-567, 509-513, and 531 of GP appear on the contact surface; the amino acids of 2G1 such as 56, 57 on CDR2 of heavy chain, and 103, 107 on CDR3 of heavy chain appear on the contact surface.

In FIG. 17 C and FIG. 18, the labels (A), (B) and (G) behind each amino acid on the GP model represent different chains of the GP trimer. Wherein (A) and (B) are the GP1 and GP2 of the same monomer, and (G) is the GP2 subunit of another monomer. The (H) and (L) behind the amino acids of the antibody model correspond to the heavy chain and the light chain, respectively. The simulation prediction results can provide information and reference for the analysis of antigen-antibody binding mode and epitope, and also help to explain the neutralization mechanism of antibody.

Example 9. Analysis of Critical Amino Acids of Antibody

Analyze the VH/Vκ of 2G1 on the IMGT website (http://www_imgt_org/), and design and synthesize the 2G1 heavy and light chain inferred germline (IGL) gene VH/Vκ-IGL.

VH-IGL nucleic acid sequence:
gaggtgcagctggtggagtctggggaggcctggtcaagcggggg gggtccctgagactctcctgtgtagtctccggattcaccttcagt agctatagcatgcactgggtccgccaggctccagggaaggggctg gagtgggtctcaggcattagtagtagtagttacatatactac gcagactcagtgaagggccgattcaccatctccagagacaacgcc aagaactcactgtatctgcaaatgaatagcctgagagccgaggac acggctgtttattactgtgcgagagatatgggatattgtagtggt ggtagctgccctaactttgacttctggggccagggaaccacggtc accgtctcctca VH-IGL amino acid sequence:
EVQLVESGGGLVKPGGSLRLSCAASGFTFSSYSMNWVRQAPGKGL

EWVSSISSSSSYIYYADSVKGRFTISRDNAKNSLYLQMNSLRAED

TAVYYCARDMGYCSGGSCPNFDFWGQGTTVTVSS

Vκ-IGL nucleic acid sequence:
gacatccagatgacccagtctccatcctccctgtctgcatctgta ggagacagagtcaccatcacttgccggacaagtcagagcattagc agctatttaaattggtatcagcagataccagggaaagcccctaaa ctcctgatctctgctgcatccaatttgcacagtggggtctcatca aggttcagtggcagtggatctgggacacatttcactctcaccatc agcagtctgcaacctgaagattttgcaacttactactgtcaacag agttacagtacccctccgttoggccaagggaccaaggtggagatc aaa Vκ-IGL amino acid sequence:
DIQMTQSPSSLSASVGDRVTITCRASQSISSYLNWYQQKPGKAPK

LLIYAASSLQSGVPSRFSGSGSGTDFTLTISSLQPEDFATYYCQQ

SYSTPSFGQGTKVEIK

Figure 19:
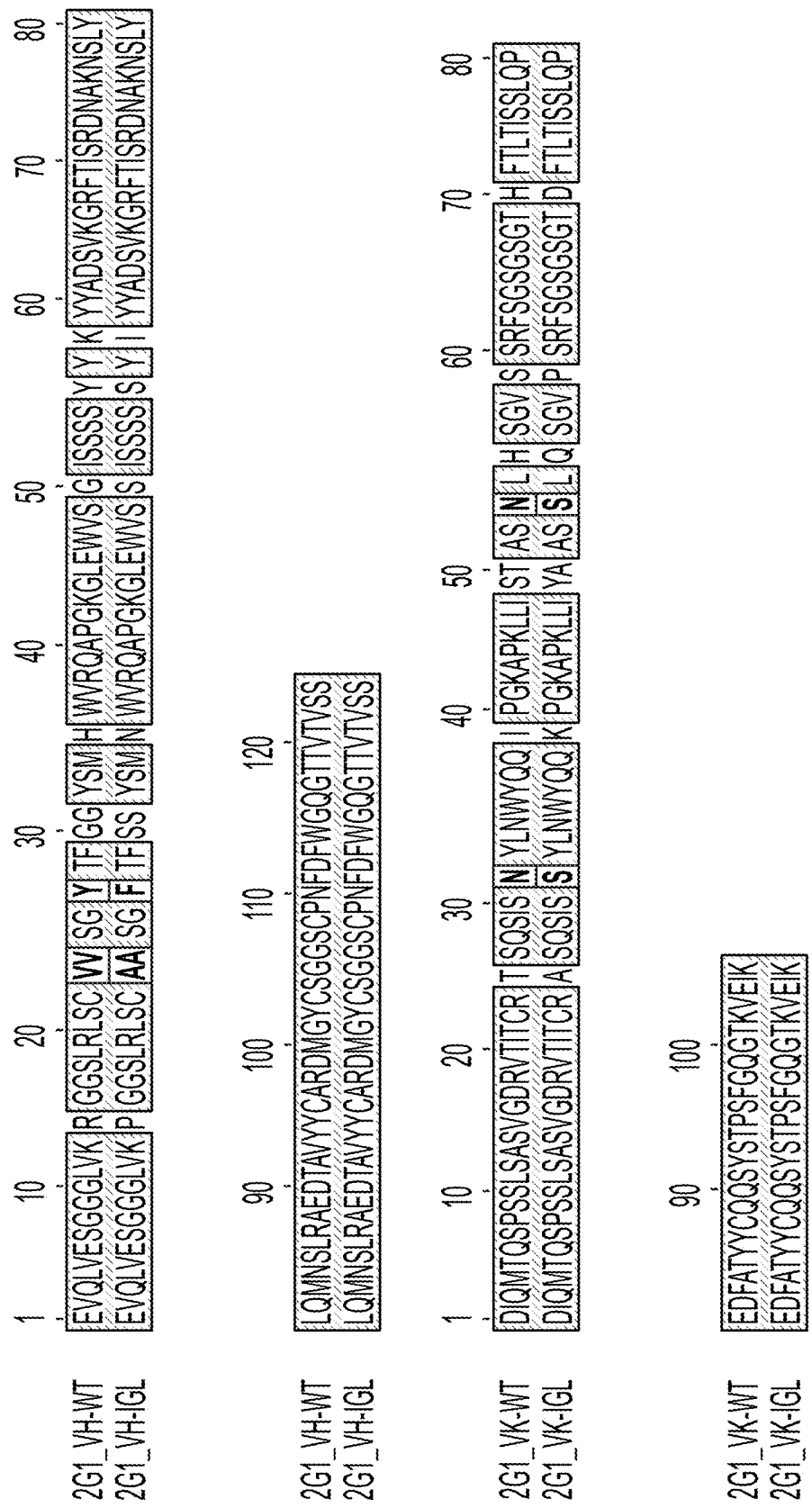
FIG. 19 Alignment of amino acid sequences between VH/Vκ-IGL and VH/Vκ-WT.

FIG. 19 shows the alignment of the amino acid sequence of VH/Vκ-IGL and VH/Vκ-WT.

Cross-pair the 2G1 light and heavy chain germline genes (VH/Vκ-IGL) with the wild-type sequence (VH/Vκ-WT) to produce 2G1 reassortants. The difference of binding ability between the 2G1 reassortants to GP and the wild type to GP is detected through ELISA to analyze the effect of the heavy chain and light chain playing on the antibody binding.

The binding $EC_{50}$ values of 2G1-WT, 2G1-$H_{WT}$/$\kappa_{IGL}$, 2G1-$H_{IGL}$/$\kappa_{WT}$ and 2G1-IGL to GP are 2.7 ng/mL, 12.1 ng/mL, 152.3 ng/mL and 251.2 ng/mL, respectively. Compared with 2G1-WT, the binding activity of 2G1-$H_{WT}$/$\kappa_{IGL}$ with light chain rematched to GP decreased by 4.4 times, while that of 2G1-IGL and 2G1-$H_{IGL}$/$\kappa_{WT}$ with heavy chain rematched decreased by 55.4 times and 91.4 times, respectively. The results indicate that the heavy chain plays a critical role for 2G1 binding to GP (as shown in FIG. 16).

The heavy chain of 2G1 is more important for its binding, and the key amino acids in CDR regions are further analyzed by alanine scanning mutation. The amino acids of the 2G1 heavy chain CDR1/2/3 are mutated to alanine (alanine to serine) to produce 2G1 mutants, and the change in binding and neutralizing activities of these mutants comparing with the wild type 2G1 is determined. As shown in FIG. 20, the results indicate that the Y57 of H-CDR2 and the C103, G106, and C108 of H-CDR3 are critical for binding and neutralization. These amino acids all appear on the contact interface of pose_96 predicted by the DS software. Among them, Y57 and C103 are the two amino acids that might form hydrogen bonds with the amino acids of GP in the LigPlot+ analysis; while G106 and C108 are located on both sides of S107 which may form hydrogen bonds with the GP.

Figure 21:
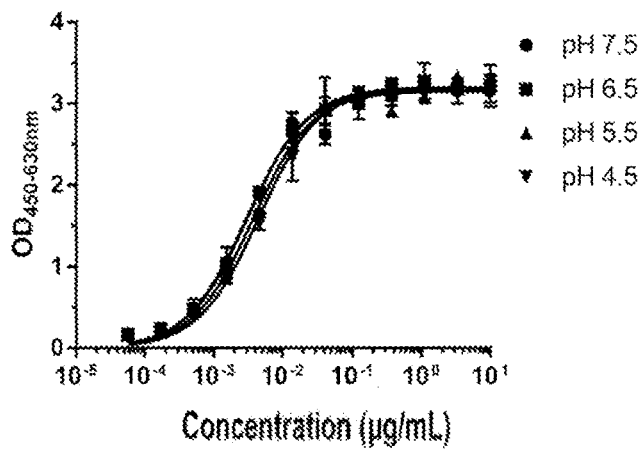
FIG. 21 Binding curves of 2G1 with GP under different pH conditions.

Example 10. Detection of Binding Activity of 2G1 to GPdMucin Under Low pH Conditions After binding to the GP on the surface of the virus, antibodies enter the host cell together with the virus particle. In the acidic environment (pH≈5.5) of the late endosome, GP binds to the receptor NPC1-C after being hydrolyzed. The binding promote the fusion of the virus with the endosomal membrane and the viral genome is released. In order to further study whether the interaction of 2G1 with GP is affected by acidic environment, the binding ability of 2G1 to GP under conditions of pH 7.5, pH 6.5, pH 5.5, and pH 4.5 in vitro is determined. The ELISA method is the same as that described in example 2.
Results:
Under four different pH conditions, the binding ability of 2G1 to GPdMucin is basically unreduced. The binding of 2G1 to GP is stable and not easily affected by the low pH environment of the late endosomes, providing a basis for its neutralization capacity (curves as shown in FIG. 21).

Example 11. Receptor Binding Blocking Test

After ebolavirus enters host cells, the glycan cap and mucin domain are removed from GP by enzymes in the acidic environment of the late endosome, and the $GP_{CL}$ structure is formed. Compared with native GP, the epitopes of $GP_{CL}$ for recognition of receptor NPC1-C are exposed. If 2G1 exerts protective effect by blocking the binding of $GP_{CL}$ to the receptor, then after $GP_{CL}$ binds to 2G1, it will not be able to bind to NPC1-C.
$GP_{CL}$ Preparation:
Adjust the concentration of GPdMucin to 2 mg/mL with PBS (pH 7.5), and add thermolysin (SIGMA, T7902-25MG) at a final concentration of 0.5 mg/mL, and incubate at 37° C. for 1 h. Add 0.5 mM Phosphoramidon (Sigma-Aldrich, R7385) to stop the reaction. Use a 0.5 mL Millipore centrifugal filter tube with 50 kDa molecule cut-off to concentrate and buffer-exchange the reaction system. Protein sample is filtered through a 0.20 μm micro filter (Millex-LG, SLLGR04NL) and purified with a Superdex 200 Increase 10/300 GL gel column (GE Healthcare).
Plates are coated overnight with 1 μg/mL $GP_{CL}$ at 4° C. After blocking for 1 h, plates are incubated with antibodies in 3-fold dilutions starting at 50 μg/mL for 30 min at 37° C. Plates are washed and incubated with 5 μg/mL biotinylated NPC1-C at 37° C. for 30 min. Bound NPC1-C is detected at 450/630 nm using HRP-conjugated streptavidin. MR72, a previously reported competitive antibody against NPC1-C, is used as a positive control.

Figure 22:
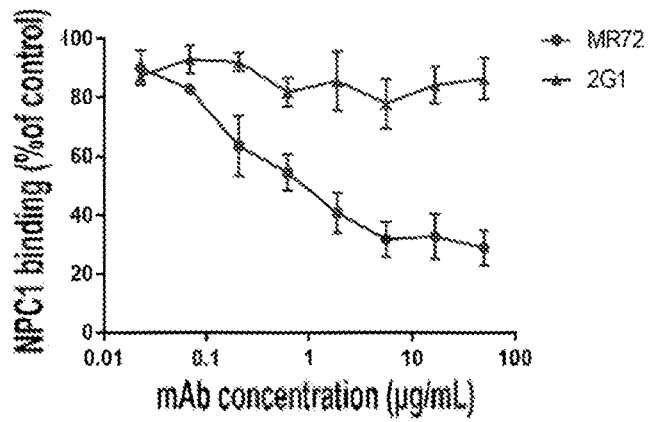
FIG. 22 Analysis on effects of 2G1 blocking the binding of $GP_{CL}$ with NPC1-C.

The control antibody MR72 can block the binding of $GP_{CL}$ with NPC1-C to 30% at a concentration of 50 μg/mL. However, 2G1 does not show an obvious inhibiting effect, indicating that it does not exert a protective effect by blocking the binding of $GP_{CL}$ to the receptor (results as shown in FIG. 22). Since the reported antibodies exert a protective effect through or partially through this mechanism, this example excludes a possible protective mechanism of the 2G1.

Example 12. Experiment of Blocking Thermolysin Digestion

Figure 23:
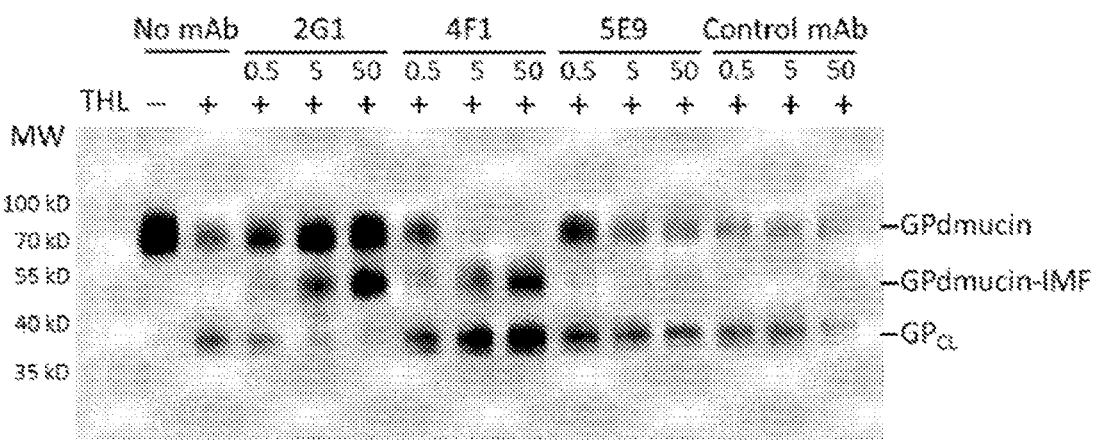
FIG. 23 Analysis of 2G1 blocking the cleavage of GPdMucin by thermolysin.

Mix 2 μg of GPdmucin-His6 expressed by Expi293 with 0.5 μg, 5 μg and 50 μg of 2G1 in 20 μL PBS, respectively, and incubate at 37° C. for 30 min. Add 1 μL of thermolysin at 1 mg/mL to a final concentration of 50 μg/mL, and incubate at 37° C. for 30 min. Boil the protein sample in a metal bath at 99° C. for 10 min immediately after adding the non-reduced loading buffer. Dilute 1 μL of reaction system (containing about 80 ng of initial GPdMucin) with 1× loading buffer to 5 μL, and then electrophoresis in 8-16% gel (GenScript, M00660). Transfer the protein to nitrocellulose membrane and use Rb pAb to 6× His taq-HRP (Abcam) to detect uncleaved GPdMucin.
Results:
2G1 can effectively block GPdMucin from being cleaved by thermolysin. With the increase of the concentration of 2G1, the amount of uncleaved GPdMucin (about 70 kDa) and the intermediate digestion product of GPdMucin-IMF (about 50 kDa) increase significantly, and the sum of the two forms is close to the initial amount of GPdMucin, while the complete cleaved product $GP_{CL}$ (about 38 kDa) are barely undetectable. This suggests that 2G1 might play a protective role in vivo by blocking the digestion of GP by enzymes (as shown in FIG. 23).

Example 13. Protection in MA-EBOV-Challenged Mice

Female BALB/c healthy mice aged 6-8 weeks are randomly assigned to several groups with 10 mice in each group. Mice are challenged with 100 PFU mice adapted EBOV virus (Mayinga) via the intraperitoneal route, and treated with 100 μg of 2G1 or the same volume of PBS 1 day or 2 days post challenge.
The two groups of mice treated with 100 μg of 2G1 on the 1 day or 2 days post challenge all survived, while all mice treated with PBS died within seven days (as shown in FIG. 24). The clinical symptoms of the mice treated with 2G1 are also improved. The body weight of the 1-day administration group does not decrease, and the body weight of the 2-day administration group only slightly reduced and return to normal soon. 2G1 is a potent EBOV protective antibody that can provide complete protection in a mouse model.

Example 14. Protection in GA-SUDV-Challenged Guinea Pigs

Female Hartley guinea pigs (250-300 g) aged 4-6 weeks are randomly assigned to several groups with 6 animals in each group. Guinea pigs are challenged with 1000×$LD_{50}$ guinea pig adapted SUDV virus in 1 mL DMEM medium via the intraperitoneal route. Guinea pigs are treated with a single dose of 5 mg or 2.5 mg of 2G1 on 3 or 4 days post challenge. Guinea pigs in the control group are treated with equal volume of PBS. The clinical symptoms of guinea pigs such as disease, survival and weight change are observed lasting for 28 days.

Figure 26:
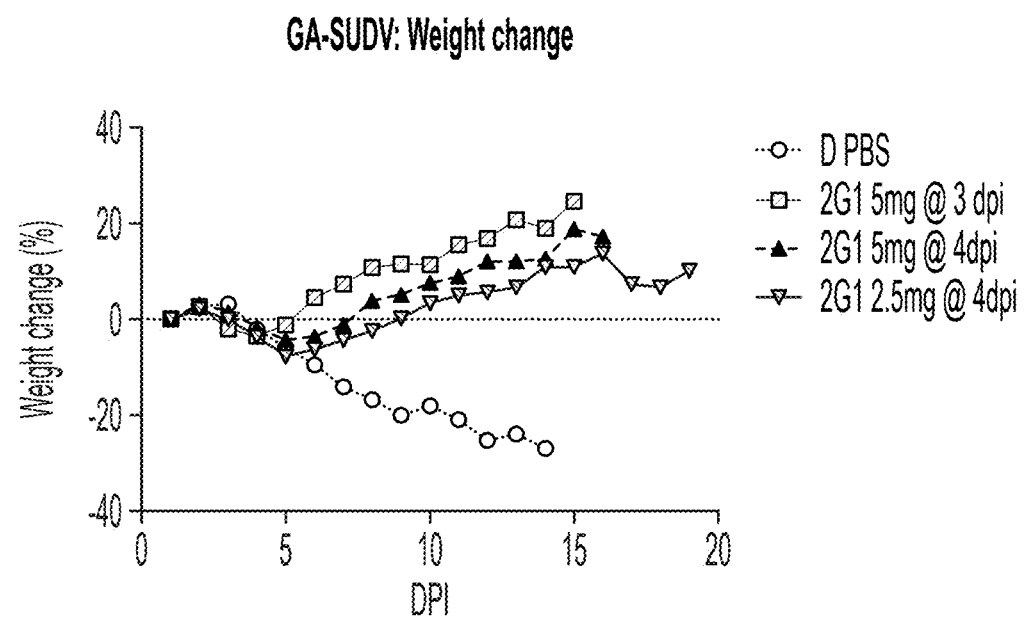

Regardless of whether treated with a single dose of 5 mg or 2.5 mg 2G1 on the 3rd or 4th day after SUDV challenge, all guinea pigs survived (as shown in FIG. 25). In terms of clinical symptoms, the body weight of the 2G1 administrated guinea pigs does not significantly decrease, while the weight of the control guinea pigs keep decreasing and eventually all died (as shown in FIG. 26). 2G1 is a potent protective antibody for SUDV and can provide complete protection in the guinea pig model. This result illustrates the good protective activity of 2G1 against SUDV.

INDUSTRIAL APPLICABILITY

The monoclonal antibody provided by the present invention is easy for industrial production, so the present invention is industrially applicable.

The invention claimed is:

1. An isolated monoclonal antibody that specifically binds to Ebola virus glycoprotein GP2 subunit, wherein the CDR1, CDR2 and CDR3 of light chain variable domain of the said antibody has the amino acid sequence as 27-32 of SEQ ID NO: 1, 50-52 of SEQ ID NO: 1 and 89-96 of SEQ ID NO: 1 respectively, the CDR1, CDR2 and CDR3 of heavy chain variable domain of the said antibody has the amino acid sequence as 26-33 of SEQ ID NO: 5, 51-58 of SEQ ID NO: 5 and 97-113 of SEQ ID NO: 5.

2. The monoclonal antibody of claim 1, wherein the light chain variable domain of the said antibody has the amino acid sequence shown in SEQ ID NO: 1, the heavy chain variable domain of the said antibody has the amino acid sequence shown in SEQ ID NO: 5.

3. The monoclonal antibody of claim 2, wherein the antibody has a light chain constant region and a heavy chain constant region, and wherein the light chain constant region has the amino acid sequence of SEQ ID NO: 3 and the heavy chain constant region has the amino acid sequence of SEQ ID NO: 7.

4. An isolated nucleic acid molecule encoding the light chain and heavy chain of the monoclonal antibody of claim 1, wherein the isolated nucleic acid molecule encoding the light chain variable domain has the nucleotide sequence shown in SEQ ID NO: 2, and the isolated nucleic acid molecule encoding the heavy chain variable domain has the nucleotide sequence shown in SEQ ID NO: 6.

5. The isolated nucleic acid molecule encoding the light chain and heavy chain of the monoclonal antibody of claim 4, wherein the isolated nucleic acid molecule further encodes the light chain constant region having the nucleotide sequence of SEQ ID NO: 4 and the heavy chain constant region having the heavy chain constant region of SEQ ID NO: 8.

6. A functional element expressing the isolated nucleic acid molecule of claim 5.

7. A host cell comprising the functional element of claim 6, wherein the host cell is 293T cell.

8. A monoclonal antibody that specifically binds to Ebola virus glycoprotein GP2 subunit treating Ebola virus disease, wherein the CDR1, CDR2 and CDR3 of light chain variable domain of the antibody has the amino acid sequence as 27-32 of SEQ ID NO: 1, 50-52 of SEQ ID NO: 1 and 89-96 of SEQ ID NO: 1 respectively, the CDR1, CDR2 and CDR3 of heavy chain variable domain of the antibody has the amino acid sequence as 26-33 of SEQ ID NO: 5, 51-58 of SEQ ID NO: 5 and 97-113 of SEQ ID NO: 5.

9. A monoclonal antibody that specifically binds to Ebola virus glycoprotein GP2 subunit as a broad-spectrum therapeutic drug for treating Ebola virus disease, wherein the CDR1, CDR2 and CDR3 of light chain variable domain of the antibody has the amino acid sequence as 27-32 of SEQ ID NO: 1, 50-52 of SEQ ID NO: 1 and 89-96 of SEQ ID NO: 1 respectively, the CDR1, CDR2 and CDR3 of heavy chain variable domain of the antibody has the amino acid sequence as 26-33 of SEQ ID NO: 5, 51-58 of SEQ ID NO: 5 and 97-113 of SEQ ID NO: 5.

10. A drug comprising the antibody of claim 1.

* * * * *